(12) United States Patent
Gordy et al.

(10) Patent No.: US 7,613,837 B2
(45) Date of Patent: Nov. 3, 2009

(54) NETWORK TAP WITH INTERCHANGEABLE PORTS

(76) Inventors: Stephen C. Gordy, 826 Santa Paula Ave., Sunnyvale, CA (US) 94084; Henry D. Poelstra, 176 Holmwood Avenue, Ottawa, Ontrario (CA) K1S 2P4; Robert W. Otis, 426 Arabian St., San Jose, CA (US) 95123; Thomas L. Gallatin, 1085 Harlan Dr., San Jose, CA (US) 95129

( * ) Notice: Subject to any disclaimer, the term of this patent is extended or adjusted under 35 U.S.C. 154(b) by 858 days.

(21) Appl. No.: 10/735,417

(22) Filed: Dec. 12, 2003

(65) Prior Publication Data
US 2004/0215832 A1 Oct. 28, 2004

Related U.S. Application Data

(60) Provisional application No. 60/459,166, filed on Mar. 31, 2003, provisional application No. 60/477,866, filed on Jun. 12, 2003.

(51) Int. Cl.
G06F 15/16 (2006.01)
(52) U.S. Cl. ....................................... 709/250
(58) Field of Classification Search ................ 709/240, 709/250
See application file for complete search history.

(56) References Cited

U.S. PATENT DOCUMENTS

| | | | | |
|---|---|---|---|---|
| 5,274,631 A | * | 12/1993 | Bhardwaj | 370/401 |
| 5,426,427 A | * | 6/1995 | Chinnock et al. | 709/239 |
| 5,610,913 A | * | 3/1997 | Tomonaga et al. | 370/219 |
| 5,903,563 A | * | 5/1999 | Rashid et al. | 370/395.65 |
| 5,940,376 A | * | 8/1999 | Yanacek et al. | 370/250 |
| 6,424,627 B1 | * | 7/2002 | S.o slashed.rhaug et al. | 370/241 |
| 6,975,209 B2 | * | 12/2005 | Gromov | 375/258 |
| 2003/0007526 A1 | * | 1/2003 | Pontis et al. | 372/38.02 |
| 2003/0056116 A1 | * | 3/2003 | Bunker et al. | 713/201 |
| 2006/0153177 A1 | * | 7/2006 | Worrall et al. | 370/366 |

OTHER PUBLICATIONS

NetOptics 4×1 GigaBit Regeneration Tap. http://web.archive.org/web/20021212211540/netoptics.com/4×1-tap.html. Dec. 12, 2002. pp. 1-5.*
U.S. Appl. No. 10/409,006, filed Apr. 7, 2003, Gordy, et al.
U.S. Appl. No. 10/735,801, filed Dec. 13, 2003, Gordy, et al.
U.S. Appl. No. 10/776,579, filed Feb. 11, 2004, Gordy, et al.
U.S. Appl. No. 10/742,172, filed Dec. 19, 2003, Gordy, et al.

* cited by examiner

Primary Examiner—Andrew Caldwell
Assistant Examiner—John M MacIlwinen

(57) ABSTRACT

A network tap for enabling attached devices, such as an intrusion detection system, to transmit information into a communication line of the network without disrupting the network traffic on the communication line. When the attached device is an intrusion detection device, the network tap is connected to a firewall. An Ethernet switch or field programmable gate array (FPGA) is incorporated in the network tap to coordinate the transmission of device data to avoid data collisions with data transmissions already existing in the communication line. The network tap may be operated in various modes to accommodate different capabilities of attached devices. In addition, the network tap has various port configurations to allow a user to connect various attached devices through a single cable or dual cables.

33 Claims, 17 Drawing Sheets

NETWORK TAP WITH INTERCHANGEABLE PORTS

RELATED APPLICATIONS

This application claims priority to and benefit of U.S. Provisional Patent Application Ser. No. 60/459,166, filed Mar. 31, 2003, entitled "Network Security Tap For Use With Intrusion Detection System" and claims priority to and benefit of U.S. Provisional Patent Application Ser. No. 60/477,866, filed Jun. 12, 2003, entitled "Network Tap with Interchangeable Ports," both of which patent applications are incorporated herein by reference in their entireties.

THE FIELD OF THE INVENTION

The present invention relates to network taps for providing access to network data for analysis purposes. In particular, the invention relates to a network tap with interchangeable ports to allow for different types of attached devices to be connected thereto.

THE RELEVANT TECHNOLOGY

In recent years, it has been desirable to be able to monitor and analyze the data flow in communication channels between and within networks. Some of these reasons include monitoring the communication channel for certain types of data, identifying and diagnosing network problems, detecting interruptions in the communication channel, detecting degradation in the communication channel, and the like. Thus, network taps, which are systems for tapping into communication lines, have been developed.

In general, a network tap is a device that is positioned in-line in a communication line and enables network analyzers or other devices to have access to a copy of the data transmitted over the communication line. A network tap is typically installed by physically cutting or breaking a network cable and positioning the tap between the two ends of the network cable. Once the tap is installed, network analyzers or other devices can access the network data without having to manipulate the network cable or altering the topology of the network. Moreover, conventional network taps enable access to the network data without disrupting or modifying the network data or the topology of the network.

Systems using conductors composed of metallic materials such as copper or other low resistance metals have generally been relatively easy to monitor and evaluate without great disruption or intrusion into the communication channel since current flows throughout the entire conductor and portions of the conductor can be externally tapped with another conductor attached to the test equipment that bleeds off a negligible amount of test current.

Additionally, optical fibers that transmit light have also been used as communication channel medium and have proven to be advantageous for the transmission of large amounts of information, both in digital and analog form. Optical fibers, unlike metallic conductors, propagate the information signal in a constrained directional path. Furthermore, the optical signal propagates down a very narrow internal portion of the conductor, making the non-intrusive external tapping of the fiber impractical. Therefore, in order to monitor data transmitted on an optical fiber, a splitter, also known as a coupler, must be placed in-line with the optical fiber to reflect a portion of the light from the main optical fiber to another optical fiber that can be coupled to a network analyzer or other test equipment.

Various types of attached devices can be used with taps. Generally, attached devices include analyzers, testing equipment, and, with increasing frequency, intrusion detection systems.

Security systems typically comprise a firewall and/or an intrusion detection system. Firewalls and intrusion detection systems are usually appliances or software applications implemented on servers or client computers in a network. When implemented as an appliance, a firewall and an intrusion detection system are usually separate devices connected to each other and to the network through multiple communication lines and/or switches.

An exemplary security system 10 of the prior art is shown in FIG. 1. System 10 includes a firewall 12 and tap 14 disposed in communication with a communication line 16. Communication line 16 comprises an incoming communication line 18 and an outgoing communication line 20, which are typically bundled in a single cable, such as an RJ-45 Ethernet cable. Firewall 12 and tap 14 are generally placed in a strategic location between the other infrastructure of local area network 11 and Internet 15. Communication line 16 is connected to an intrusion detection system 22 and a dedicated network analyzer or other testing equipment 24 through tap 14. That is, tap 14 includes couplers 26, 28 or other components that enable intrusion detection system 22 and testing equipment 24 to be placed in communication with the data flow in communication line 16.

Tap 14 may be configured to allow access to data transmitted over either a metallic conductive or an optical fiber communication line 16 as will be understood by those of skill in the art. In general, network taps, such as tap 14, transmit data obtained from communication line 16 in a uni-directional manner to connected devices which, in the example illustrated in FIG. 1, include the intrusion detection system 22 and the testing equipment 24. Conventional network tap 14 does not permit devices connected thereto to transmit data onto communication line 16. Network taps were originally developed to enable testing equipment to access network data and it has generally been understood that network taps should not modify the data on communication line 14 or 16 or add data thereto. Indeed, conventional network taps do not have a network presence, meaning that they are transparent to other devices on the network and the network operates as if the network tap did not exist. Thus, the flow of data over communication lines 19, 21, 23 and 25 to devices that access the network via tap 14 is uni-directional and the backflow of data to communication line 16 through tap 14 is prohibited.

With the advent of intrusion detection systems, network taps began to be used to provide such intrusion detection systems with access to network data. However, because conventional network taps permit only uni-directional data flow to connected devices, intrusion detection systems have been configured to communicate with the firewall through an additional external, or out-of-band, communication line 30. A switch 32 (e.g., an Ethernet switch) is positioned on communication line 30 to direct data packets to firewall 12. This architecture enables intrusion detection system 22 to identify indicia of unauthorized access and to issue kill packets to firewall 12 to prevent additional unauthorized access. In fact, the intrusion detection system 22 can send any type of authorized packets through tap 14 to the firewall 12 and the LAN 11 as necessary. In addition, another cable between switch 32 and LAN 11 can be disposed to allow the intrusion detection system 22 to send kill packets to the LAN.

It will be appreciated that the additional communication line 30 and switch 32 between intrusion detection system 30 and firewall 12 presents additional hardware that needs to be purchased and configured. Furthermore, switch 32 is often expensive. It would thus be an advantage to reduce the number of communication lines required to connect a communication line evaluation device, an intrusion detection system and/or firewall to a network. Furthermore, it would be an advantage to reduce the expense of having an extra switch to allow the intrusion detection system to communicate with the firewall.

In addition, the exemplary system of FIG. 1 generally requires a pair of ports to connect each attached device, intrusion detection system 22 or testing equipment 24. Thus, only those intrusion detection systems 22 or testing equipment 24 that are connectable by dual cables can be used with the tap 10 in FIG. 1. However, some intrusion detection systems are manufactured to connect to a network tap through a single cable, while others can connect to a network through two cables. The intrusion detection systems which have only one port may also require a costly external switch device to combine two ports into one. This can be done with a span port which combines all of the Ethernet traffic onto a single port. Also, there are other analyzers that connect to network taps using one or two cables. However, previous network taps were not flexible enough to accommodate different attached devices requiring different connective configurations. It would thus be an advantage to provide a network tap which allows for multiple types of attached devices to be connected thereto. Additionally, it would thus be advantageous to provide the user with the ability to select between various port configurations or even disable some of the ports.

Furthermore, it would be advantageous to be able to enable or disable a network tap with the ability to send information back through the network tap without disrupting the data flow in the main communication line depending on the type of attached device. For some types of attached device, the ability to send device data would be advantageous, while for other types of attached devices, a passive connection is preferred. However, the prior art taps did not provide this type of flexibility. It would thus be an advantage to provide a user with a network tap in which the ability to send information through the tap could be enabled or disabled.

BRIEF SUMMARY OF THE INVENTION

In another embodiment, the routing node includes an integrated circuit which is configured to route packets flowing through the network tap based on a programmed logic control.

The network tap also includes an integrated circuit. In one embodiment, the integrated circuit is a Field Programmable Gate Array (FPGA). The FPGA can be programmed to control other components of the network tap. In addition, the FPGA can be connected to an external client device which enables the FPGA to be programmed by the network administrator or upgraded. As such, it will be appreciated that the FPGA provides integrated circuitry which enhances the functionality of the network tap.

The network taps of the present invention permit the attached devices to communicate with the network directly through the taps. This is in contrast to conventional network taps that do not allow the backflow of data from attached devices to the communication that has been tapped. The network taps of the invention eliminate the need for the out-of-band communication link between attached devices and other components of the network.

In addition, the network taps of the present invention may operate in a plurality of modes. This enables a user to utilize all or only some of the functional capabilities possible in the network taps of the present invention. This may be advantageous where a user desires a network tap that may be connected to a variety of attached devices, for a variety of purposes. Various components of the network tap may be enabled or disabled by the FPGA remotely or through manual switches to select between the various modes. Exemplary modes include a port configuration where both ports are enabled to transmit network data and one port is enabled to transmit device data; both ports are enabled to transmit network data and both ports are disabled from transmitting device data; one port is enabled to transmit network data and transmit device data while the other port is disabled from transmitting network data and device data; one port is enabled to transmit network data and the other port is enabled to transmit device data; and the like.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to network taps and associated systems incorporating various security features for monitoring and evaluating network data. The network taps of the invention permit attached devices, such as intrusion detection systems, to access network data and to send data packets, such as kill packets, to a firewall or other areas of a local area network through the network taps.

1. Overview of Operation of Network taps

Figure 1:
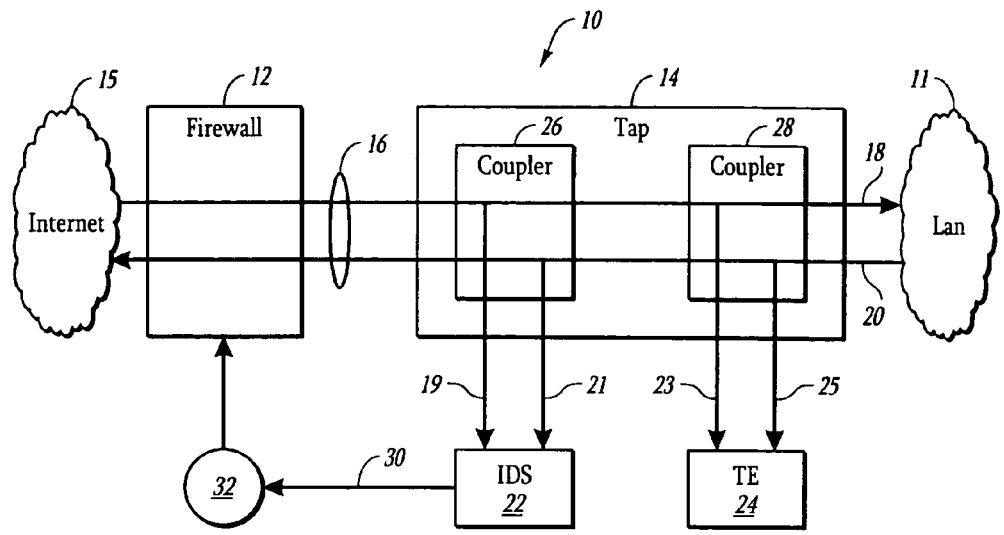
FIG. 1 illustrates a block diagram of a prior art system incorporating an intrusion detection system in communication with a firewall through an external communication line.
Figure 2:
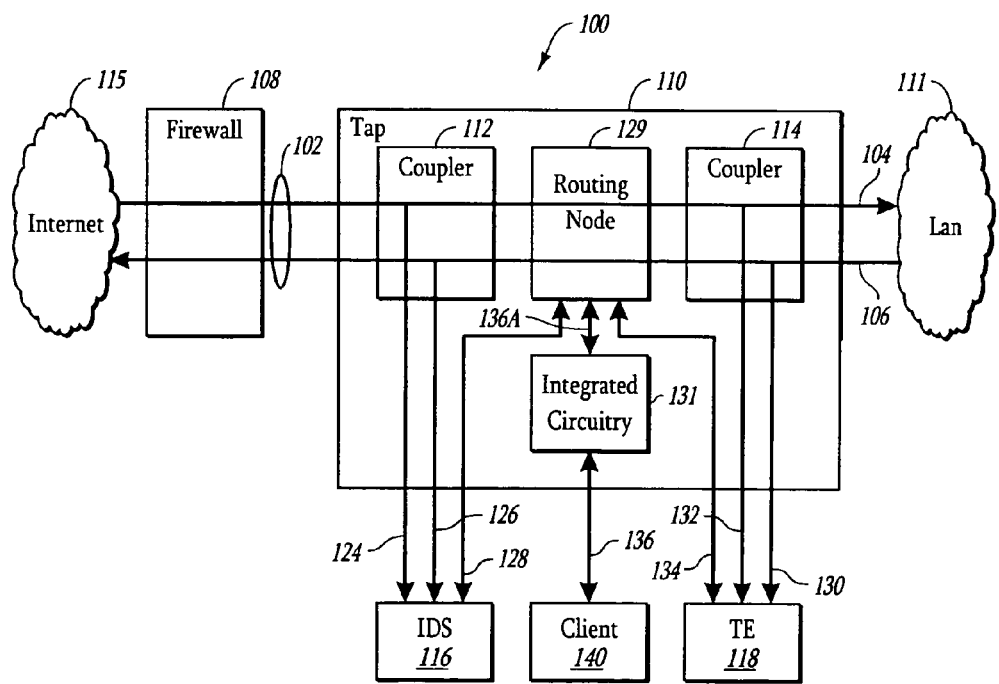
FIG. 2 illustrates a block diagram of an exemplary network tap according to one embodiment of the present invention.

FIG. 2 illustrates an exemplary system 100 incorporating network taps 110 that implement features of the present invention. The network taps are illustrated in FIG. 2 at a conceptual level, and the details of the circuitry of the network taps of the invention are disclosed hereinbelow in reference to FIGS. 3 through 14B. It will be appreciated that system 100 may be implemented in communication systems comprising either conductive metal or optical fiber communication lines. System 100 is configured to analyze data carried by a main network cable 102. As shown in FIG. 2, network cable 102 includes an incoming communication line 104 and an outgoing communication line 106. In Gigabit Ethernet, however, the communication lines are full-duplex, which means they can "receive" and "transmit" at different times on the same physical lines. The terms "incoming" and "outgoing", as used herein, are from the standpoint of the local area network 111.

Network cable 102 is connected to a firewall 108. Firewall 108 filters the data packets that are transmitted on communication lines 104 and 106, and controls the data that is permitted to pass between local area network 111 and Internet 115. Because firewall 108 acts generally as a filter, certain unwanted data can pass therethrough until firewall 108 is programmed to filter that particular unwanted data. Firewall 108 acts in unison with an intrusion detection device to maximize its filtering capabilities to prevent unwanted intrusions, as will be discussed further below.

Network cable 102 is also connected to a network tap 110. Network tap 110 is configured with a pair of dedicated couplers 112, 114. Couplers 112 and 114 allow an intrusion detection system 116 and a testing equipment 118 to be connected to network tap 110. Couplers 112 and 114 are configured to enable a portion of the energy of the data signal of network cable 102 to be tapped and transmitted to intrusion detection system 116 and/or testing equipment 118. In some cases, the energy of the signal is not decreased at all; rather, it is increased, because it is regenerated within the network tap 110. Intrusion detection system 116 and testing equipment 118 are some examples of "attached devices" that may be connected to network tap 110. However, an "attached device" may be any equipment which is selectively connectable to network tap 110 to be allowed to communicate with network tap 110. An attached device may or may not be enabled to send information into network tap 110. Again, it is noted that the details of the circuitry and, in particular, the couplers 112 and 114, that permit network data to be tapped and routed according to this and other embodiments of the invention are disclosed in reference to FIGS. 3 through 144B below.

Network tap 100 comprises a routing node 129 positioned over communication cable 102. As used herein, the term "routing node" refers to a component of the network tap that permits data packets from the intrusion detection system or other attached devices to be inserted into the main communication cable so that the data packets can be transmitted to a firewall or another designated network location. In general, the routing node is positioned at the intersection of the main communication cable and the communication line from one or more attached devices. In general, the routing node can include any component that permits data packets from the intrusion detection system to be inserted onto the main communication cable without modifying or being intrusive with respect to the data that is otherwise transmitted thereon. Examples of routing nodes include the Ethernet switches and the Field Programmable Gate Arrays (FPGAs) disclosed herein. It is noted that the term "routing node" does not necessarily connote a conventional router or the function of a conventional router, but is instead a general term intended to encompass any suitable component that can control the placement or insertion of data packets from the intrusion detection system or other attached device as set forth above.

The intrusion detection system 116 is connected to network tap 110 via a communication line 124 that carries a representation of the signal that is transmitted on communication line 104. The intrusion detection system is also connected to network tap 110 by a communication line 126 that carries a representation of the signal that is transmitted on communication line 106. In addition, a communication line 128 from intrusion detection system 116 is coupled to routing node 129. Communication line 128 conveys information from intrusion detection system 116 to routing node 129, which inserts the information into main communication cable 102. Alternatively, routing node 129 may be programmed to direct the information to other components of the network. In still another embodiment, integrated circuit 131 may use the information from intrusion detection system 116 as a basis for other functions. That is, network tap 110 is configured to allow intrusion detection system 116 to send information into the network tap, whereas conventional taps do not allow such functionality.

Intrusion detection system 116 monitors the traffic on network cable 102 and determines whether there are indicia indicating that an attempt to breach the security associate with local area network 111 is being made. Generally, intrusion detection system 116 is programmed with various algorithms that enable it to detect certain intrusive activity. For example, intrusion detection system 116 may compare the source material and compare the signatures to a database of known attack signatures, compare the traffic load to a baseline traffic load, raising a warning if the traffic load exceeds the baseline to indicate increased activity in the communication line, or detect for anomalies in the data flow, for network attacks, hacking, and the like. The network taps of the invention can be used or adapted for use with substantially any conventional intrusion detection system or other intrusion detection systems that will be developed in the future.

Network tap 110 allows an attached device to send device data from the attached device. Device data may be instructions from the attached device or messages to be sent to other components of the network. In the case of intrusion detection system 116, the device data is a control signal in the form of one or more kill packets. When an intrusion is suspected, intrusion detection system 116 sends a kill packet through communication line 128, which are directed by routing node 129 into outgoing communication line 106 to firewall 108. The network tap 110 may also be configured to route the kill packets or other related data packets to other nodes in the local area network 111. The data packets instruct (i.e., reprogram) firewall 108 to place a filter on a specific IP address that appears to be associated with the potential intrusion. That is, the data packets sent from intrusion detection system 116 reprogram firewall 108 to prevent further passage of information coming from the suspected intrusive source. Intrusion detection system 116 may also maintain a log of activity of the network on which network tap 110 is placed. System 100 thus provides a dynamic, learning network security system.

As discussed above, it has been undesirable in the past to send data packets back into a communication line through tapping devices for various security reasons, including possibility of data collisions, losing data packets, and decreasing network integrity. However, in the present invention, routing node 129 allows limited information to be transmitted into communication line 102 from intrusion detection system 116, thereby greatly enhancing the ability of an intrusion detection system to operate in an integrated manner in a network. More details regarding the use of network tap 100 with an intrusion detection system is found in U.S. patent application Ser. No. 10/409,006, filed Apr. 7, 2003, entitled "Network Security Tap For Use With Intrusion Detection System," which is incorporated herein by reference.

Test equipment 118 is connected to network tap 110 via communication lines 130, 132 that carry a representation of the signal that is transmitted on communication lines 106 and 104, respectively. The information from communication lines 130, 132 is sent to testing equipment 118 for analysis. In general, testing equipment 118 can be any network analyzer or other device that requires non-intrusive access to the network data. For example, the testing equipment 118 can obtain and display statistics associated with the network data; can analyze the type of data in network cable 102, the integrity of the communication flow in network cable 102, or interruptions in network communication; can search for specific patterns, detects errors, etc. In addition, a communication line 134 from testing equipment 118 is coupled to routing node 129. Communication line 134 conveys information from testing equipment 118 to routing node 129, which inserts the information into main communication cable 102. Alternatively, routing node 129 may be programmed to direct the information to other components of the network. In still another embodiment, integrated circuit 131 may used the information from testing equipment 118 as a basis for other functions. That is, network tap 110 is configured to allow testing equipment 118 to send information into the network tap, whereas conventional taps do not allow such functionality.

Routing node 129 ensures that data is not lost and is efficiently sent from both main communication cable 102, intrusion detection system 116 and testing equipment 118. The network taps of the present invention thus provide added security features without compromising the integrity of the system. Furthermore, network taps of the present invention are non-intrusive, allowing the network tap to continue to analyze network communications without interrupting the flow of traffic on communication line 102.

Network tap 110 also includes an integrated circuit 131 which may be programmed to provide additional functionality to network tap 100. Integrated circuit 131 is placed in communication with routing node 129 via communication line 135. Integrated circuit 131 is connected to a client device 140 through a communication line 136. Client device 140 can be used to program integrated circuit 131 to allow network tap 110 to control, modify, or analyze data flow in communication line 102. Client device 140 may be any hardware device having an application thereon that allows a user to program integrated circuit 131. For example, client device 140 may be a personal computer, a laptop computer, a hand-held personal data assistant (PDA), a cellular telephone, a dedicated programming device designed specifically for programming the integrated circuit 131, and the like. In some embodiments, client device 140 may be combined with intrusion detection system 116 and/or testing equipment 118 such that the combination acts interchangeably as a client device and attached device.

Accordingly, integrated circuit 131 can be programmed with additional functionality. For example, because routing node 129 is disposed over the other communication lines and integrated circuit 131 is in communication with routing node 129, integrated circuit 131 can be programmed to control, modify, or analyze the data of any communication line within network tap 110. For example, in addition to routing information from the various attached devices to the network, network tap 110 can be used as a network analyzer or a jammer.

It will be appreciated that this additional circuitry within network tap 110 allows network tap 110 to have additional functionality not available in prior art taps, including the native ability to perform some analysis of network data and reporting of statistics associated with the network data. Additionally, network tap 110 may be configured to monitor and analyze multiple communication channels.

2. Embodiments of Circuitry and Components of Network Taps

Figure 3:
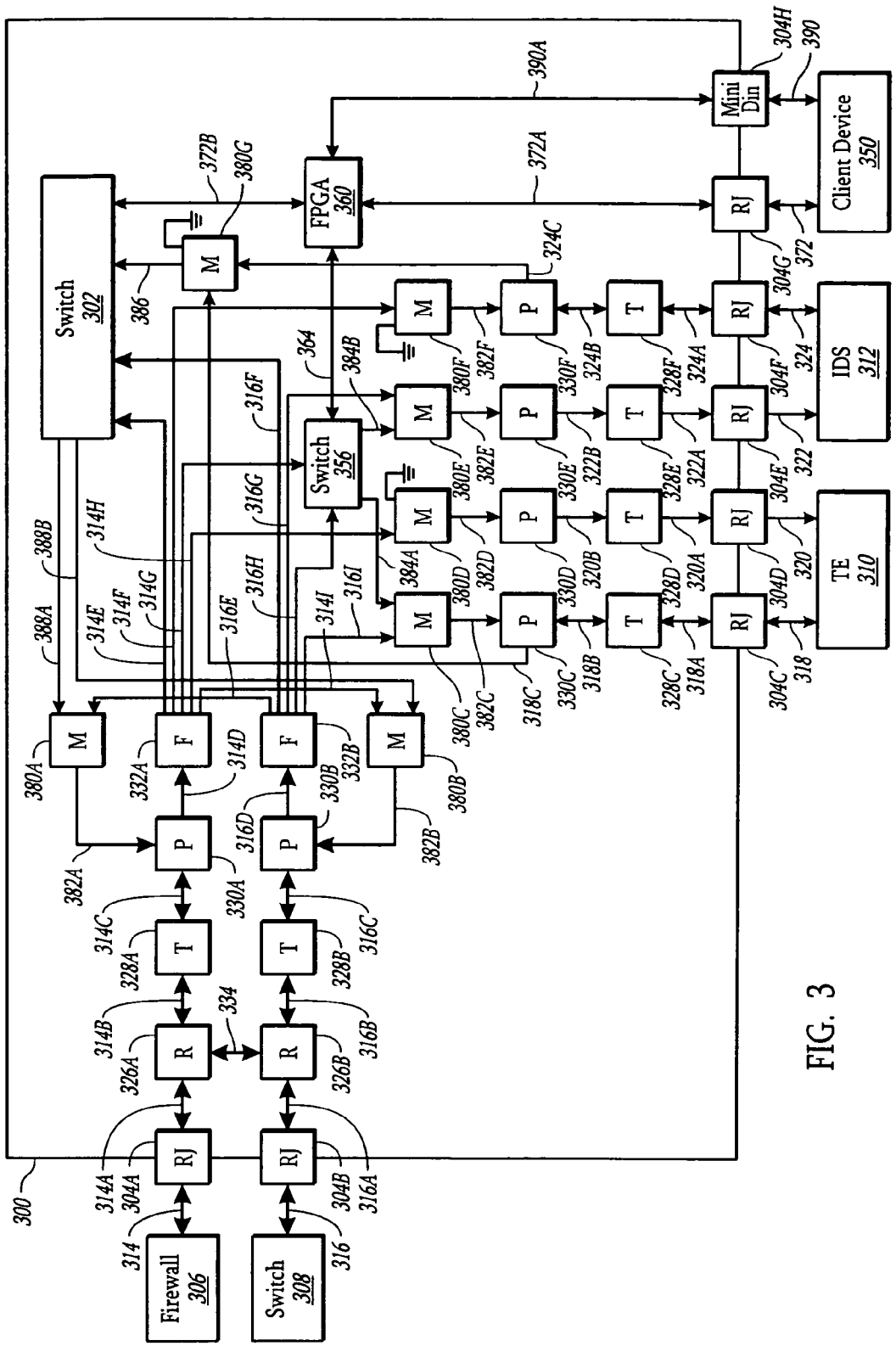
FIG. 3 illustrates a block diagram of a network tap of the present invention implementing a plurality of multiplexers, switches, and an FPGA for allowing the network tap to operate in a number of different modes.

With reference to FIG. 3, a network tap 300 having multiple port configurations is illustrated. The multiple port configurations is made possible by a routing node 302, a switch 356, an integrated circuit 360, and a plurality of multiplexers 380A through 380G. In the embodiment of FIG. 3, the routing node is an Ethernet switch 302. The integrated circuit 360 is a field programmable gate array (FPGA). Switch 302 is configured to direct data packets flowing through network tap 300 and routing the data packets to their correct destination. FPGA 360 is configured to control switch 302 and other components of network tap 300 as will be discussed in more detail below.

In another embodiment, routing node 302 may be an integrated circuit, such as an FPGA or an ASIC (Application Specific Integrated Circuit), which is combined with integrated circuit 360. This particular embodiment is described in more detail in U.S. patent application Ser. No. 10/776,579, filed Feb. 11, 2004, entitled "Network Tap with Integrated Circuitry", which is incorporated herein by reference.

Network tap 300 is configured to tap data carried by primary communication lines or a network cable, represented in FIG. 3 by communication lines 314, 316. Network tap 300 is configured with ports 304A, 304B, which enable network tap 300 to be connected to the primary communication lines using, for example, RJ-45 connectors. A firewall 306 and network switch 308 are in communication with the primary communication lines 314, 316, respectively. Thus, in reference to the network description provided in FIG. 2, information flows through the main communication lines 314 and 316 from the Internet, through firewall 306, then through network tap 300, and finally to switch 308, which directs the data packets to the appropriate destinations in the local area network, and the data also can flow in the reverse direction from the local area network to the Internet.

Network tap 300 also includes ports 304C through 304F that enable network tap 300 to be connected to testing equipment 310 and an intrusion detection system 312, through communication lines 318, 320, 322, 324, respectively. For purposes of this invention, testing equipment 310 and intrusion detection system 312 are example of "attached devices" that may be connected to network tap 300. Various commercially-available intrusion detection devices exist, substantially any of which can be used with the network taps of the invention. Moreover, substantially any testing equipment that require non-intrusive access to network data can be used with the network taps of the invention.

Ports 304A through 304F may be any port configuration that provides a suitable communication line connection to network tap 300. In embodiments where the communication lines consist of conductive metallic wires, ports 304A through 304F may be RJ-45 connections. As is known in the art, RJ-45 connections can be configured for connection to Ethernet cables. In the drawings accompanying this specification, the label "RJ" is used to represent an RJ-45 connection. Because RJ-45 cables support full duplex communication, a pair of RJ-45 ports connects the main communication line, represented by numerals 314 and 316, to the network tap. However, in embodiments where the main communication line uses optical fibers, network tap 300 may use two connectors to connect with the firewall 306 and two additional connectors to connect with the switch 308. Thus, in embodiments for optical fiber communication lines, it will be understood that ports 304A through 304F (or any other port illustrated) may be modified to have a "transmit" port and a "receive" port to allow the communication line to be connected thereto. The type of connection for ports 304A through 304F may be configured depending on design requirements. Suitable hardware configurations for ports 304A through 304F are discussed more fully below with respect to FIGS. 4A and 4B. In one embodiment configured for 10/100Base-T applications, ports 304A through 304F provide MDI/MDIX connections.

The main cable can thus be viewed as a first segment 314 and a second segment 316 which allows uninterrupted bi-directional data flow between firewall 306 and switch 308. When network tap 300 is connected, first segment 314 and second segment 316 must be physically severed to allow network tap 300 to be disposed therebetween. When first segment 314 and second segment 316 are connected to network tap 300, a complete data circuit is formed, re-establishing the uninterrupted, bi-directional data flow between firewall 306 and switch 308. Ports 304A and 304B enable the connection of first segment 314 and second segment 316 of the main cable to network tap 300, respectively.

Ports 304A, 304B are connected to relays 326A, 326B via communication lines 314A, 316A, respectively. Relays 326A, 326B send the information to transformers 328A, 328B through communication lines 314B, 316B, respectively. If there is no system power at the network tap, relays 326A, 326B transmit the data directly to each other via communication link 334. Thus, the data link through the network tap is operational even if the power supply is lost or disabled.

In one preferred embodiment, transformers 328A, 328B provide the isolation and common mode filtering required to support category 5 UTP cables for use in Ethernet 10/100/1000Base-T duplex applications. Information flows from transformers 328A, 328B to physical layer devices 330A, 330B through communication lines 314C, 316C, respectively. Physical layer devices ("PHYs") 330A, 330B convert the electrical signals into a desired format which is compatible with the signal's intended destination. For example, physical layer devices 330A, 330B convert the signal to a format which is compatible with switch 302. The data from physical layer devices 330A, 330B are sent to fan out buffers 332A, 332B by communication lines 314D, 316D, respectively.

At fan out buffers 332A, 332B, the data packets are duplicated and sent out to a number of different locations. The various modes and port configurations that will be identified further below are made possible by multiplexers 380A through 380G. Multiplexers 980A through 980G are circuit devices that have several inputs and one user-selectable output.

Fan out buffer 332A sends information to switch 302, multiplexer 380F, switch 356, multiplexer 380D and multiplexer 380B through communication lines 314E through 314I, respectively. Similarly, fan out buffer 332B sends data packets to multiplexer 380A, switch 302, multiplexer 380E, switch 356 and multiplexer 380C through communication lines 316E through 316I, respectively.

Switch 356 is disposed between fan out buffers 332A, 332B and multiplexers 380C, 380E. Communication lines 314G, 316H from fan out buffers 332A, 332B are connected to switch 356. Switch 356 contains circuits which allow communication lines 314G, 316H to be integrated into a single communication signal. Switch 356 combines the data flow from both communication lines 314G, 316H into a single signal which is also "mirrored" (duplicated) in switch 356. A first signal is sent to multiplexer 380C through communication line 384A. A second, duplicate signal is sent to multiplexer 380E through communication line 384B. It will be appreciated that switches 302, 356 may be the same switch. For example, the Scalable 12-Port Gigabit Ethernet Multi-Layer Switch manufactured by Broadcom located in Irvine, Calif. In addition, Broadcom provides the hardware required to implement all of the required connections.

Multiplexers 380C through 380F send information to physical layer devices 330C through 330F through communication lines 382C through 382F, respectively. Physical layer devices 330C through 330F transmit information to transformers 328C through 328F through communication lines 318B, 320B, 322B, 324B, respectively. In addition, transformers 328C through 328F transmit information to ports 304C through 304F via communication lines 318A, 320A, 322, 324A, respectively. Data flow in communication lines 318, 318A, 318B, 324, 324A, 324B is bi-directional. In contrast, data flow in communication lines 320, 320A, 320B, 322, 322, 322B is uni-directional. In one embodiment, physical layer devices may be a transceiver such as the Alaska® Quad Gigabit Ethernet Transceiver manufactured by Marvell® located in Sunnyvale, Calif.

Thus, ports 304C, 304F are configured to receive bi-directional flow of information while ports 304D, 304E are configured to receive uni-directional flow of information. That is, ports 304D, 304E are configured to receive only outgoing information from network tap 300. However, the various modes and port configurations provided by network tap 300, as described in further detail below, may utilize all, some, or none of the capacity of each port 304C through 304F.

Physical layer devices 330C and 330F transmit information to multiplexer 380G through communication lines 318C, 324C, respectively. Multiplexer 380G is connected to switch 302 through communication line 386. Switch 302 is connected to multiplexers 380A, 380B through communication lines 388A, 388B, respectively. Finally, multiplexers 380A, 380B are connected to physical layer devices 330A, 330B through communication lines 382, 382B, respectively.

Testing equipment 310 is connected to ports 304C, 304D by communication lines 318, 320, respectively. In addition, intrusion detection system 312 is connected to ports 304E, 304F by communication lines 322, 324, respectively.

As shown in FIG. 3, various communication lines allow bi-directional data flow therethrough. These bi-directional communication lines are illustrated in FIG. 3 with a double-headed arrow, although physically these lines are embodied using several pairs of conductors. In contrast, other communication lines allow only uni-directional data flow therethrough. Uni-directional data flow is indicated by a single-headed arrow.

As illustrated in FIG. 3, ports 304C and 304F allow bi-directional flow of data therethrough. Where switch 302 is an Ethernet switch, ports 304C and 304F are configured to accept Ethernet traffic generated by an attached device. In the embodiment of FIG. 3, the attached device is intrusion detection system 312 or testing equipment 310. Ports 304C and 304F are thus configured to receive various types of device data from the attached device. Device data may be instructions from the attached device or messages to be sent to other components of the network. In the case of intrusion detection system 312, the device data is a control signal in the form of one or more kill packets.

When intrusion detection system 312 identifies intrusive activity, it sends a kill packet through port 304F to transformer 328F and to physical layer device 330F. The kill packet is sent from physical layer device 330F through communication line 324C to multiplexer 380G. Multiplexer 380G then sends the kill packet to switch 302 through communication line 372B. The kill packet contains header information such that Ethernet switch 302 directs the data packet to firewall 306. That is, the kill packet is sent via communication line 388A to multiplexer 380A and then onto physical layer device 330A through communication lines 382A. Physical layer device 330A then sends the kill packet into the data flow path of firewall 306. The kill packet sent from intrusion detection system 312 instructs firewall 306 to prohibit further data flow from the intrusive source. The kill packet can also be addressed to another network node in the local area network, in which case, switch 302 also directs the kill packet to the other designated node. In one embodiment, two kill packets are sent—one to the firewall 306 and one past the firewall to the server to which the third party is connected so that the session is killed at both ends.

Similarly, device data can be sent through port 304C from an attached device. That device data follows the data flow path to physical layer device 330C where it is sent to multiplexer 380G through communication channel 318C. Multiplexer 380G sends the device data to switch 302 through communication channel 386. Switch 302 then routes the device data to its intended destination based on header information contained in the data packet.

It will be appreciated that Ethernet switch 302 represents a hub for data packets coming from ports 304A, 304B, 304C and 304F. In addition, as will be discussed below, device data may also come from port 304G. Ethernet switch 302 examines the destination address in the header of each data packet and sends the data packet to the corresponding port. Thus, Ethernet switch 302 prevents the collision of data by coordinating data flow therethrough. The process by which Ethernet switches 302 direct the flow of data is well known in the art. A suitable Ethernet switch is the Scalable 12-Port Gigabit Ethernet MultiLayer Switch manufactured by Broadcom located in Irvine, Calif. Because switch 302 is connected to both multiplexers 380A, 380B by communication lines 388A, 388B, information may be sent to any port in network tap 300. This may be desirable, for example, where intrusion detection system 312 sends information regarding the intrusive source to be logged in the network system.

In addition, switch 302 may be configured to collect some information on the data flowing through switch 302. Examples of this type of statistical information is the address information in the header of data packets, CRC errors, the percentage of utilization of a particular communication line, the transmission speed in the main communication cable, and the like.

Furthermore, network tap 300 comprises an FPGA 360 that is connected to switches 302, 356 through communication lines 372B, 364, respectively. FPGA 360 is allowed to receive and transmit communication through an external source, client device 350 through port 304G. Client device 350 comprises client software which allows a user to program FPGA 360 externally. FPGA 360 may thus be programmed to control physical layer devices, multiplexers, switches, relays, or other components of network tap 300. In addition, FPGA 360 may be programmed to add or alter functionality of the FPGA. For example, in one embodiment, FPGA 360 can be programmed to collect certain statistical information on the data flow in network tap 300 and to transmit those statistics to client device 350. As such, it will be appreciated that FPGA 360 is provided with additional functionality.

In one embodiment, port 304G comprises an Xport™ Embedded Device Server manufactured by Lantronix® located in Irvine, Calif. Xport™ can communicate with FPGA 360 by serial communication. The Xport configuration allows for direct communication between client device 350 and FPGA 360. Thus, client device 350 is connected to port 304G through communication line 372. Port 304G may thus be properly termed a "management port." Port 304G is connected directly to FPGA 360 through communication line 372A. This embodiment eliminates the requirement for other electrical components to connect FPGA 360 to port 304G.

In addition, network tap 300 includes port 304H configured as a Mini Din Serial port. Alternatively, port 304H could be a DB-9 serial port. Client device 350 connects to port 304H through communication line 390. Port 304H is connected to FPGA 360 through communication line 390A. Port 304H enables serial communication between client device 350 and FPGA 360. Thus, client device 350 can communicate with FPGA 360 to debug network tap 300, configure the IP setup of network tap 300, and other control functions.

Figure 4A:
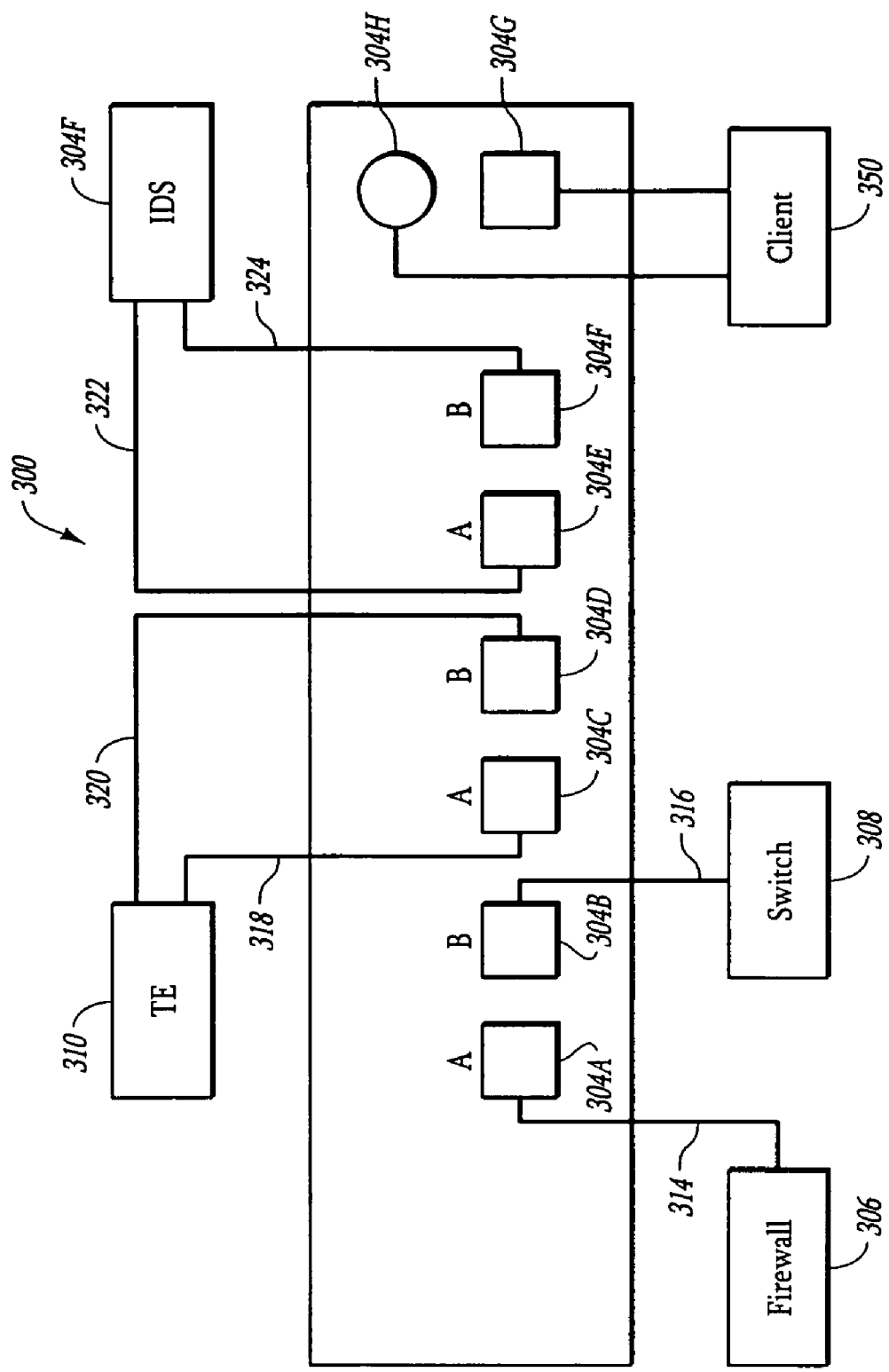
FIG. 4A illustrates an exemplary hardware configuration for a network tap configured to connect to metal communication lines in accordance with an embodiment of the present invention.

FIG. 4A illustrates an exemplary hardware configuration for connecting a metallic conductive wire communication line to network tap 300. That is, port 304A is connected to firewall 306 through communication line 314 and port 304B is connected to switch 308 through communication line 316. In addition, ports 304C, 304D are connected to testing equipment 310 through communication lines 318, 320, and ports 304E, 304F are connected to intrusion detection system 312 via ports 322, 324. In addition, ports 304G and 304H are connected to client device 350.

Figure 4B:
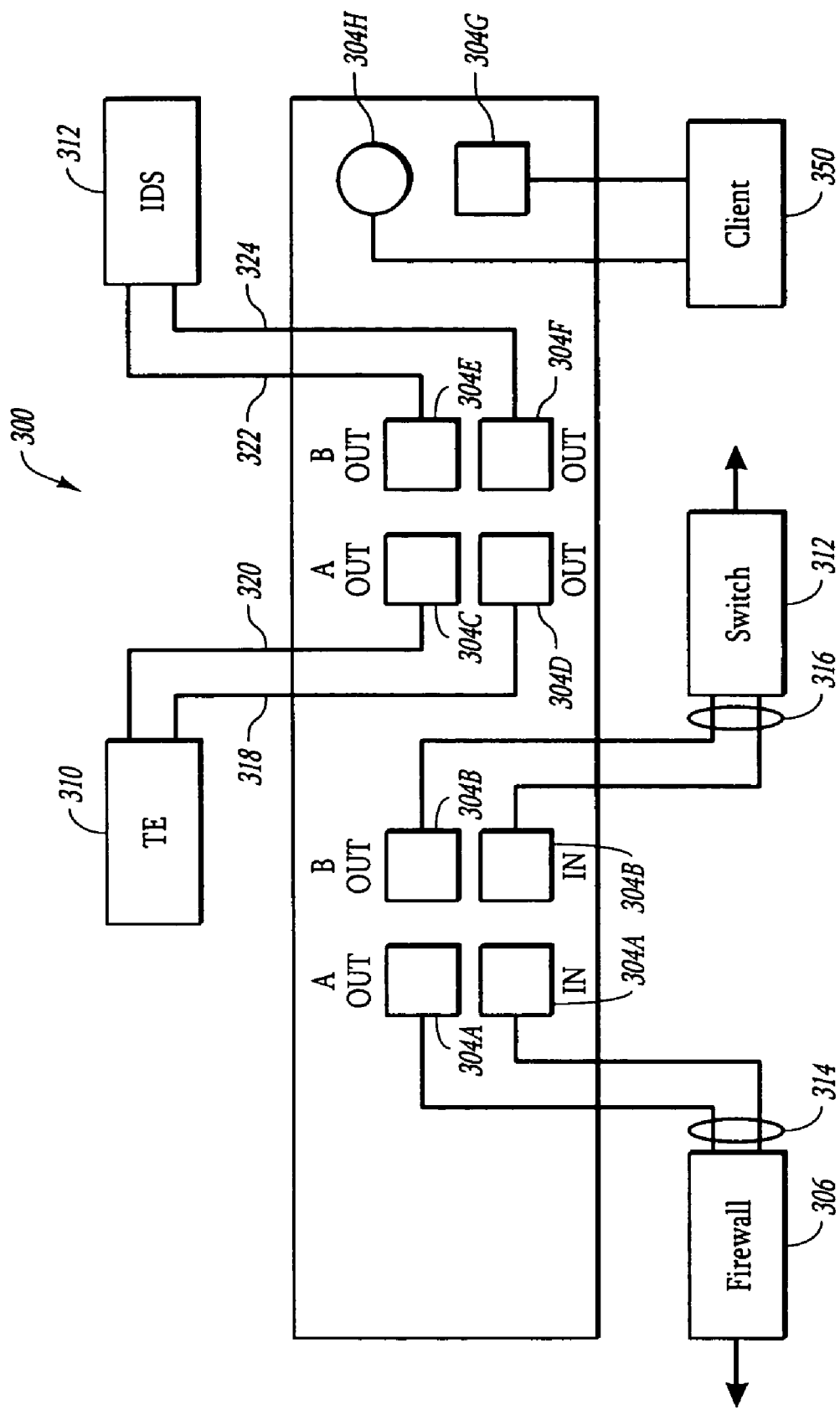
FIG. 4B illustrates an exemplary hardware configuration for a network tap configured to connect to optical fibers in accordance with an embodiment of the present invention.

In contrast, FIG. 4B illustrates an exemplary hardware configuration for connecting an optical fiber communication line to network tap 300. In this embodiment, port 304H is modified to have an IN or "transmit" port and an OUT or "receive" port which connects to firewall 306 through communication line 314. Note that communication line 314 is represented by two optical fibers, one representing ingoing data flow, the other representing outgoing data flow. Port 304B is modified to have an IN port and an OUT port which connects to firewall 306 through communication line 316 (again, with communication line 316 being represented by distinct optical fibers). Ports 304C, 304D are modified to have two OUT ports which allow for uni-directional data flow to testing equipment 310. Ports 304E, 304F are modified to connect to intrusion detection system 312, with port 304E allowing uni-directional data flow and port 304F allowing bi-directional data flow. In addition, ports 304G and 304F are connected to client device 350.

Client device 350 can be either local with respect to network tap 300 or can be with communication being established using the Internet or a private network. Client device 350 allows FPGA 360 to be reprogrammed at the location where network tap 300 is connected to the network instead of having to disconnect network tap 300 from the network to reprogram or replace the network tap. Those skilled in the art will recognize that client device 350 will give network tap 300 an IP address for purposes of network configurations. Where prior art taps were not detectable by network monitoring devices, some embodiments of network taps of the present invention will be recognizable.

The connection between FPGA 360 and client device 350 allows FPGA to be programmed with additional features. In one embodiment, FPGA 360 is configured to extract statistical information from switch 302 through communication line 362. Examples of statistical information is the address information in the header of data packets, CRC errors, the percentage of utilization of a particular communication line, the transmission speed in the main communication cable, and the like.

Figure 5:
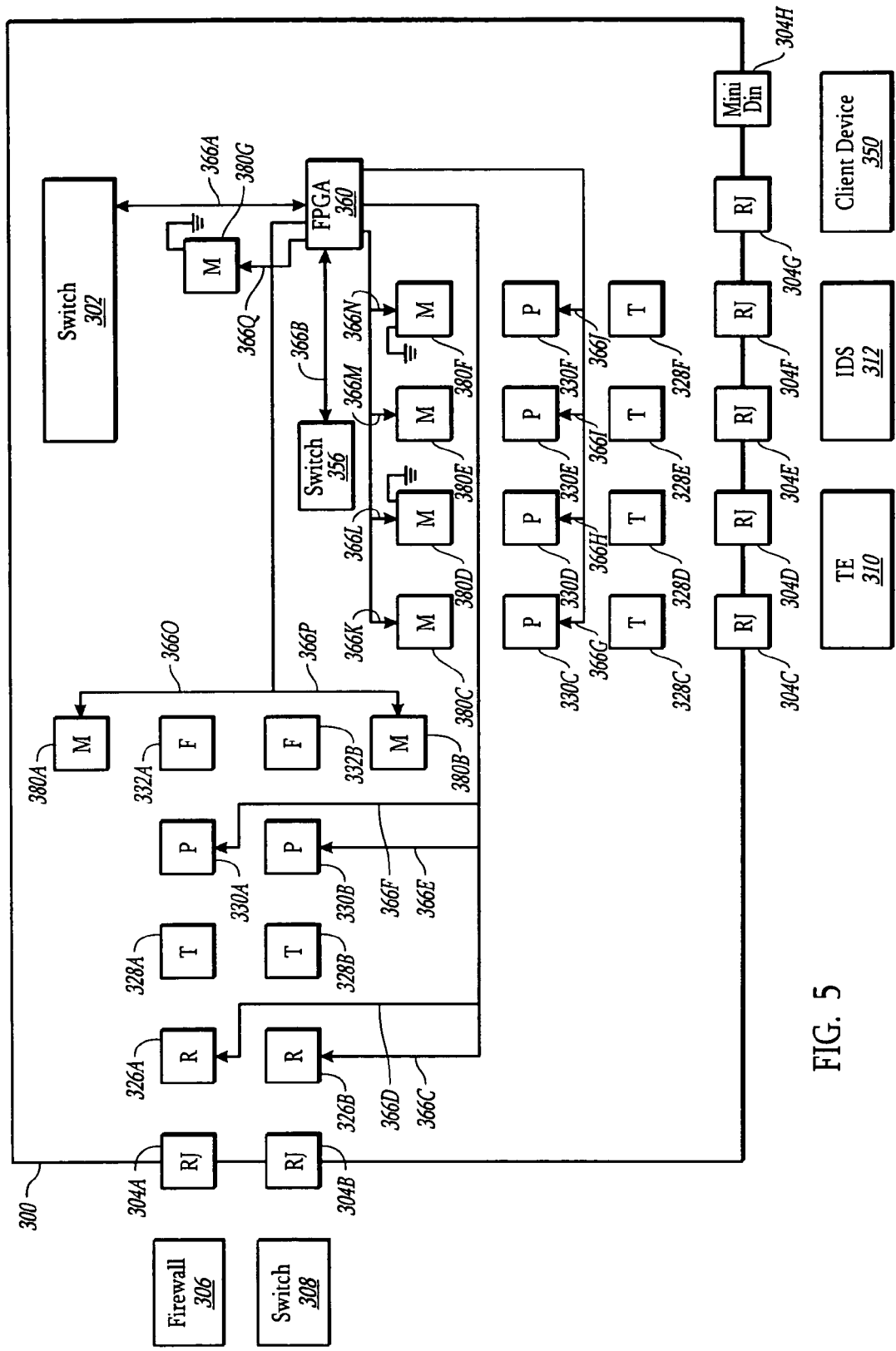
FIG. 5 illustrates a block diagram of the network tap of FIG. 3 illustrating how the FPGA controls other components of the network tap.

FPGA 360 is also configured to control components of network tap 300. With reference to FIG. 5, FPGA 360 controls switches 302, 356, physical layer devices 330A through 330G, multiplexers 380A through 380G and relays 326A, 326B as indicated by control lines 366A through 366Q.

Figure 6:
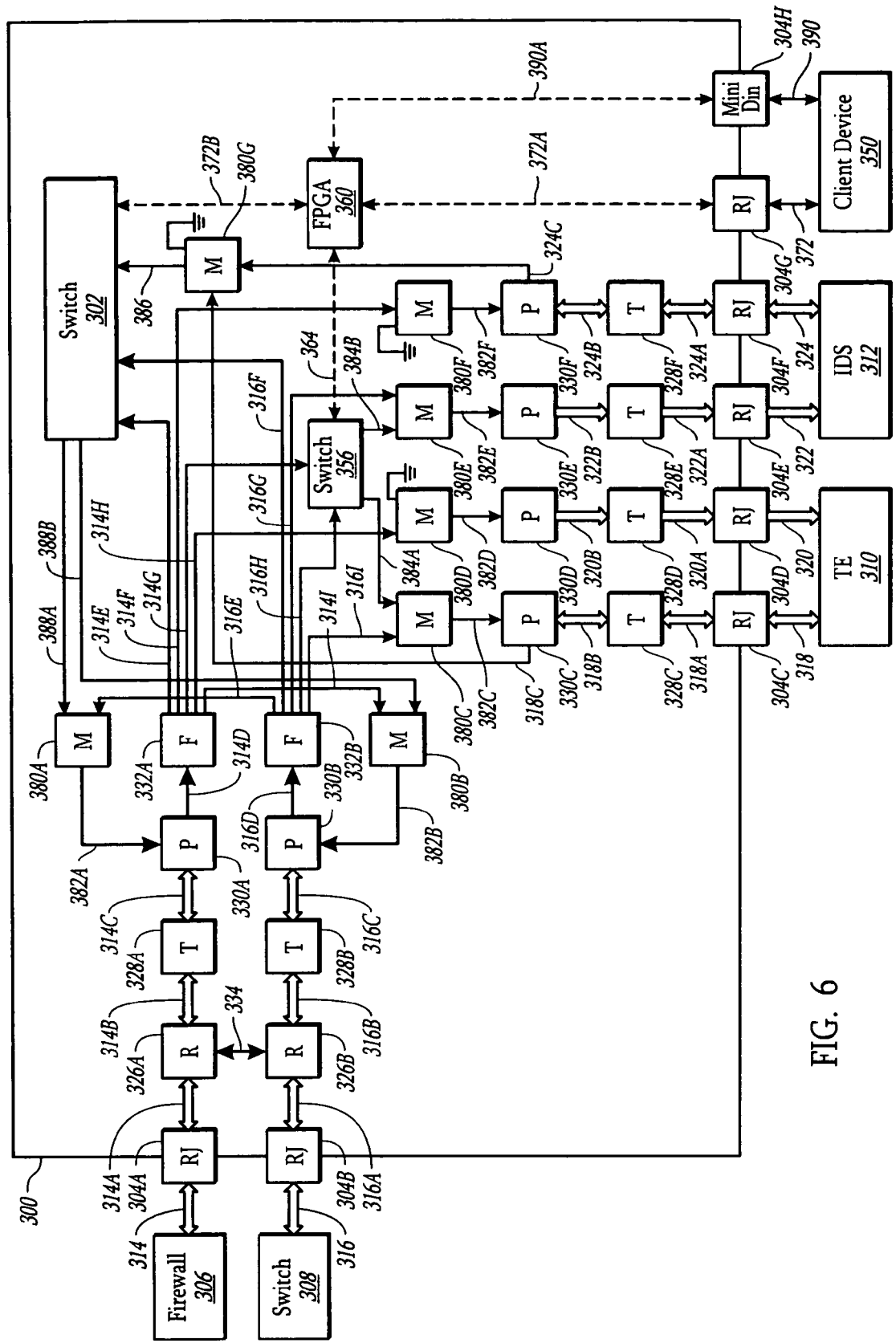
FIG. 6 illustrates a block diagram of signal formats for use in the network tap of FIG. 3.

Different types of signaling formats may be used in network tap 300. As illustrated in FIG. 6, in one embodiment, signals between ports 304A through 304H and aphysical layer devices 330A through 330F may be transmitted in Media Dependent Interface (MDI) format. This is represented by the double-lined arrows in FIG. 6. Signals between one physical layer devices to another physical layer device may be transmitted in Serial Gigabit Media Independent Interface (SGMII) format which consist of serial 1.25 GHz encoding. This is indicated in FIG. 6 by single-lined arrows. The exception to this may be signals coming to and from FPGA 360, which may communicate with switches 302, 356 using either a PCI bus, SPI communication or I²C serial communication format. This is represented in FIG. 6 by dashed-lined arrows. Those skilled in the art will recognize that other configurations may be used depending on design considerations.

Figure 7:
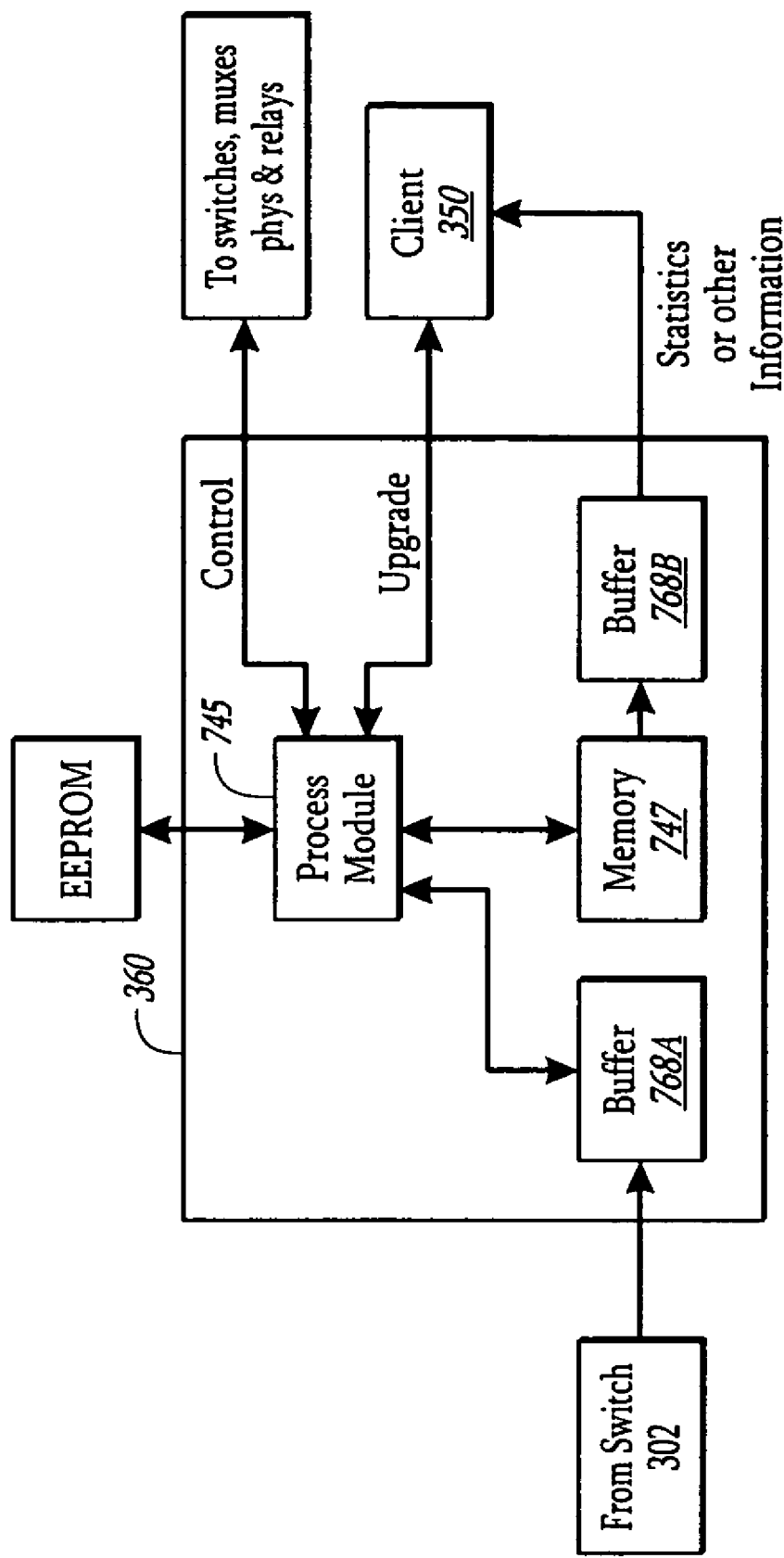
FIG. 7 illustrates a block diagram of the FPGA of FIG. 3.

With reference to FIG. 7, a block diagram of FPGA 360 is illustrated. In the embodiment of FIG. 7, FPGA 360 comprises process module 745, memory 747, and buffers 768A, 768B. Generally, FPGA 360 has a control function, an upgrading function, and an analysis function. First, FPGA 360 provides for the control of components of network tap 360. As shown in FIG. 7, process module 745 can be connected to physical layer devices, multiplexers, relays, and switches to control their operation. Second, the connection between process module 745 and client device 350 allows FPGA 360 to be reprogrammed by an external user. Finally, FPGA 360 can be used to extract statistics or other information from network tap 300. Information from switch 302 is sent to buffer 768A in FPGA 360. The buffered information is then analyzed by process module 745. Certain statistics may be stored in memory 747. Upon request by client device 350, these statistics can be transferred to buffer 768B and then transmitted to client 350.

Figure 8:
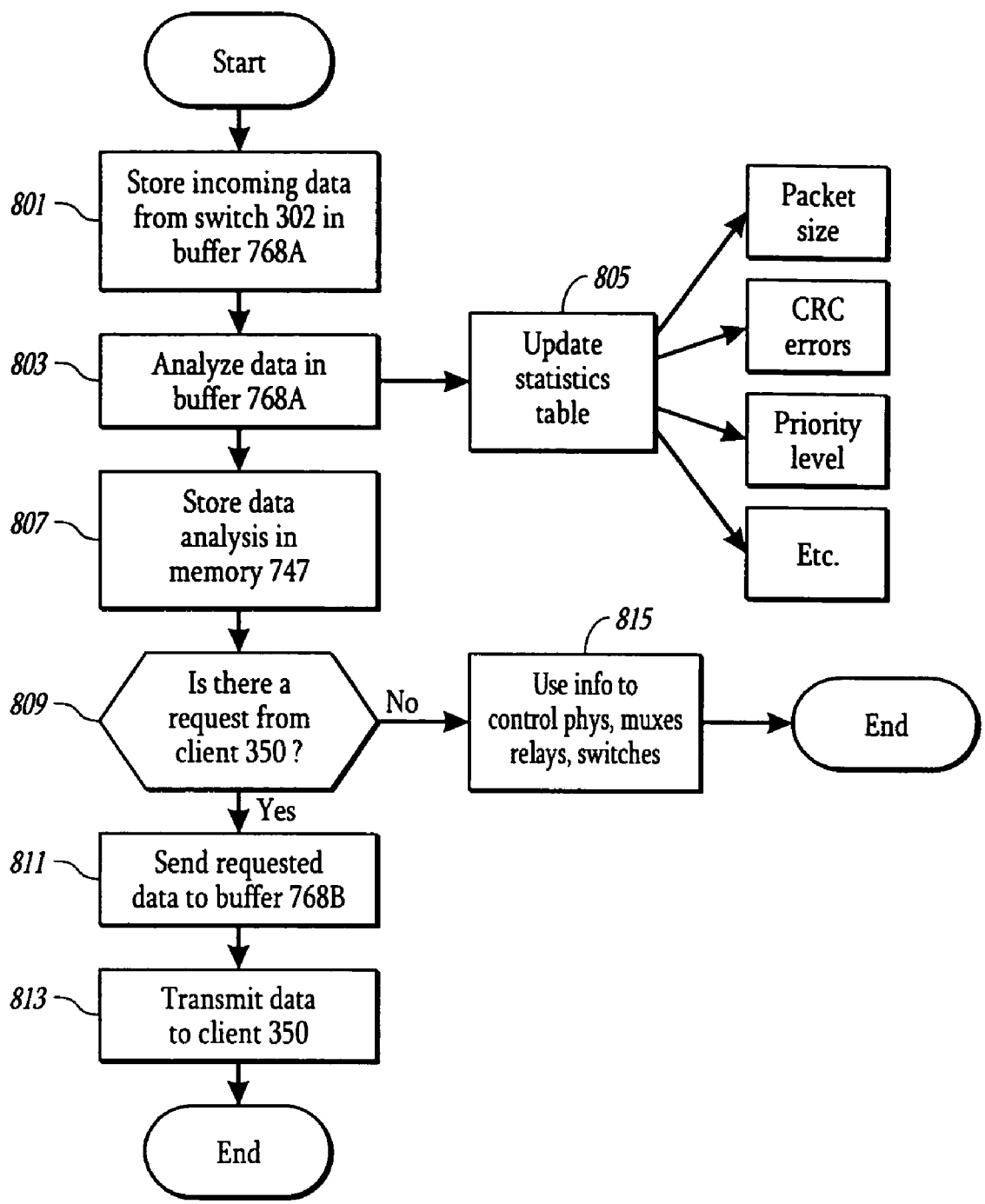
FIG. 8 illustrates a flow diagram of the process logic steps for the FPGA of FIG. 3.

FIG. 8 illustrates a process logic flow diagram for FPGA 360 in one embodiment where switch 302 functions as a statistical collector. At step 801, incoming data from switch 302 is stored in buffer 768A. At step 803, process module 745 analyzes the data, depending on the type of predetermined statistics a user desires. For example, process module 745 may determine the packet size, existence of CRC errors, priority level and the like. At step 805, process module 745 may update a statistics table stored in memory 747. At step 807, the data analysis is stored in the local memory 747.

FPGA 360 may then do a number of things with the data stored in local memory 747. In one instance, FPGA 360 can respond to a request from client device 350. At step 809, client device 350 requests data from FPGA 360. At step 811, process module 745 processes the request and writes the requested data into buffer 768B. At step 813, process module 745 sends the requested data in buffer 768B to client device 350.

FPGA 360 may also use the data stored in local memory 747 to enable it to control switches, physical layer devices, or relays. At step 815, process module 745 accesses the data stored in local memory 747 to instruct it how to control or operate switches 302, 356 or other components of FPGA 360.

Network tap 300 thus provides a number of features. First, switch 302 allows device data from an attached device to be sent to various components of the network without disrupting data flow through network tap 300. Second, switch 302 can collect some statistical information about the data flowing therethrough. This statistical information can be retrieved by FPGA 360 and sent to client device 350. Third, FPGA 360 provides for control of components of network tap 300. Fourth, FPGA 360 can be programmed by an external source (i.e., client device 350) to perform other functions. Finally, as will now be discussed, network tap 300 provides a number of different modes and port configurations in which network tap 300 may operate. The type of mode that is enabled will determine if any of these functions listed above are enabled.

The various modes and port configurations will now be described in detail. FPGA 360 enables network tap 300 to operate in different modes and, within these modes, to have various port configurations. FPGA 360 controls switch 302, switch 356 and multiplexers 380A through 380G. At least six different modes are possible, depending on whether these three components are part of the main data link. The following table provides an overview of the types of modes which are possible and which components are enabled/disabled. As used herein, the term "enabled" is used to refer to the situation in which a particular component is part of the main data link. In the following table, the term ON is used to indicate that a component has been enabled. The term "disabled" is used to refer to the situation in which a particular component is taken out of the main data link. In the following table, the term OFF is used to indicate that a component has been disabled.

| MODE | Switch 302 | Multiplexer 380G | Switch 356 |
| --- | --- | --- | --- |
| Passive | OFF | OFF | OFF |
| Switching | ON | OFF | OFF |
| Switching/Return Path | ON | ON | OFF |

-continued

| MODE | Switch 302 | Multiplexer 380G | Switch 356 |
|---|---|---|---|
| Switching/Return Path/ Combined Tap | ON | ON | ON |
| Switching/Combined Tap | ON | OFF | ON |
| Combined Tap | OFF | OFF | ON |

Figure 9:
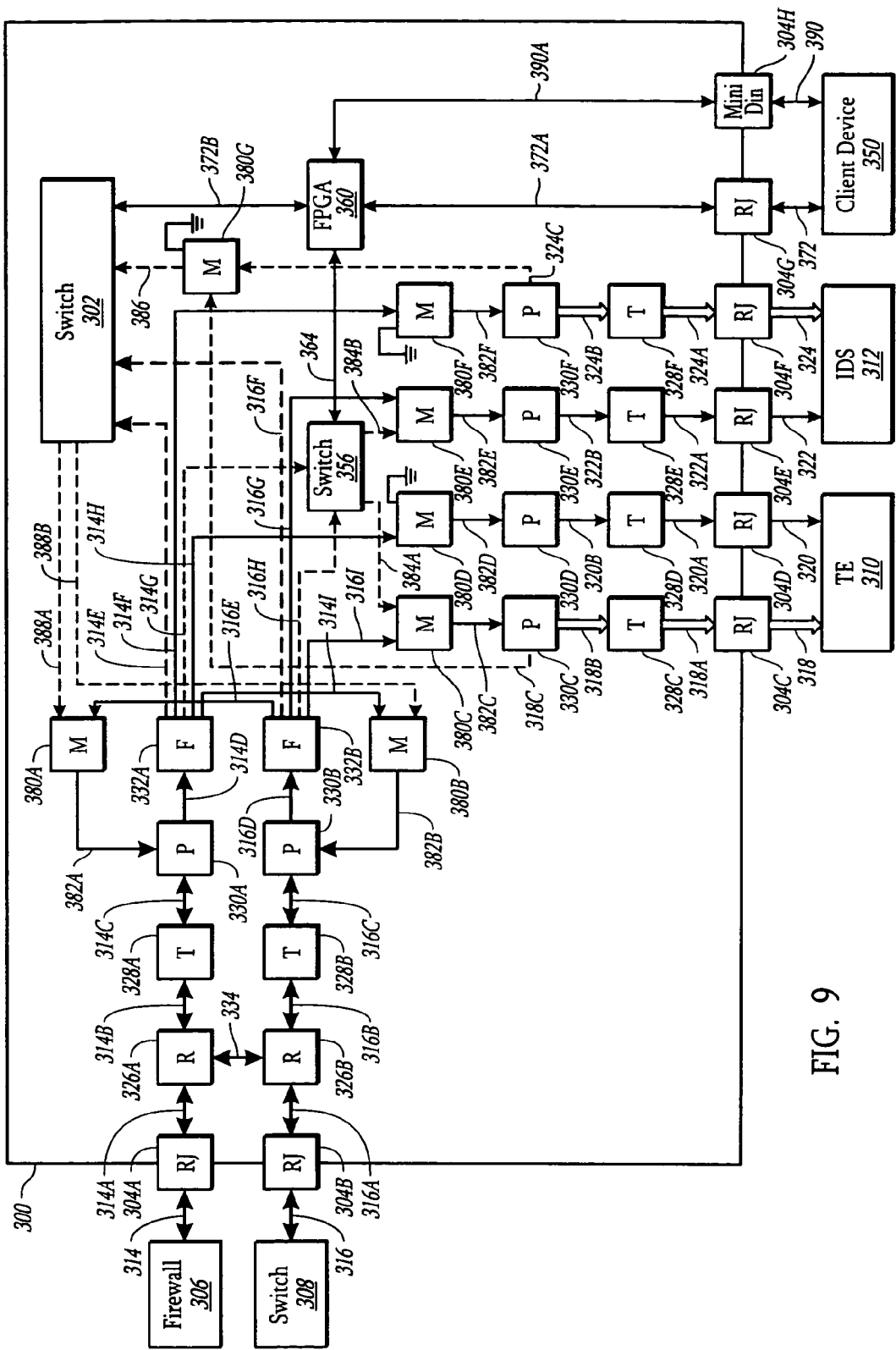
FIG. 9 illustrates a block diagram of the network tap of FIG. 3 in a passive mode.

In one embodiment, network tap 300 may operate in a "passive" mode. The "passive" mode is illustrated in FIG. 9. In the passive mode, FPGA 360 disables switch 302, switch 356 and multiplexer 380G. That is, switch 302, switch 356 and multiplexer 380G are taken out of the main data link and do not use data coming or going from connecting communication lines. In addition, FPGA 360 controls multiplexers 380A, 380B to select communication lines 314I and 316E and ignore lines 388A, 388B. As illustrated in FIG. 9, the communication lines going to switch 302, switch 356 and multiplexer 380G are shown in dashed-lines to indicate that data flowing through these communication lines is not used. Thus, the only data used flows through the communication lines shown in solid lines.

A complete data path is formed between firewall 306 and Ethernet switch 308. That is, data flowing from firewall 306 flows through the path formed by communication lines 314A, 314B, 314C, 314D, 314I, 382B, 316C, 316B and 316A. Similarly, data flowing from Ethernet switch 308 flows through the path formed by communication lines 316A, 316B, 316C, 316D, 316E, 382A, 314C, 314B and 314A.

In addition, split-off data paths are created by fan out buffers to testing equipment 310 and intrusion detection system 312. Because multiplexer 380G is disabled, it does not use data coming from communication lines 318C and 324C. Thus, while communication lines 318, 318A, 318B, 324, 324A and 324B and are configured to handle bi-directional data flow, they have been modified in FIG. 9 as a single-headed arrow line to indicate uni-directional data flow therethrough.

As a result of the foregoing configuration controlled by FPGA 360, ports 304C through 304F have a configuration which does not necessarily maximize all of the functionality provided in network tap 300. In the "passive" mode both testing equipment 310 and intrusion detection device 312 are allowed to receive network data through ports 304C through 304F. However, any device data entering the network tap 300 from testing equipment 310 and intrusion detection device 312 is not used, even though ports 304C and 304F are configured for bi-directional data flow. This configuration of ports 304C and 304F in the "passive" mode is indicated by the unidirectional arrows in FIG. 9.

The term "enabled to transmit network data" is used to refer to a port that allows network data therethrough. The term "disabled from transmitting network data" is used to refer to a port which cannot transmit network data due to how FPGA 360 controls components in network tap 300. The term "enabled to transmit device data" is used to refer to a port which is allowed to transmit device data therethrough, which device data is further used by components of network tap 300. In contrast, the term "disabled from transmitting device data" is used to refer to a port that allows device data therethrough, but which device data is not used in network tap 300 due to how FPGA 360 controls components of network tap 300. Thus, ports 304C through 304F are all enabled to transmit network data. Ports 304C through 304F are disabled from transmitting device data.

Both ports 304C and 304D are required to properly connect testing equipment 310. Similarly, both ports 304E and 304F are required to properly connect intrusion detection system 312. In addition, intrusion detection device 312 would require an additional communication line and external switch to communicate with firewall 306 (not shown). Thus, it will be appreciated that network tap 300 can be operated in a completely passive manner.

Figure 10:
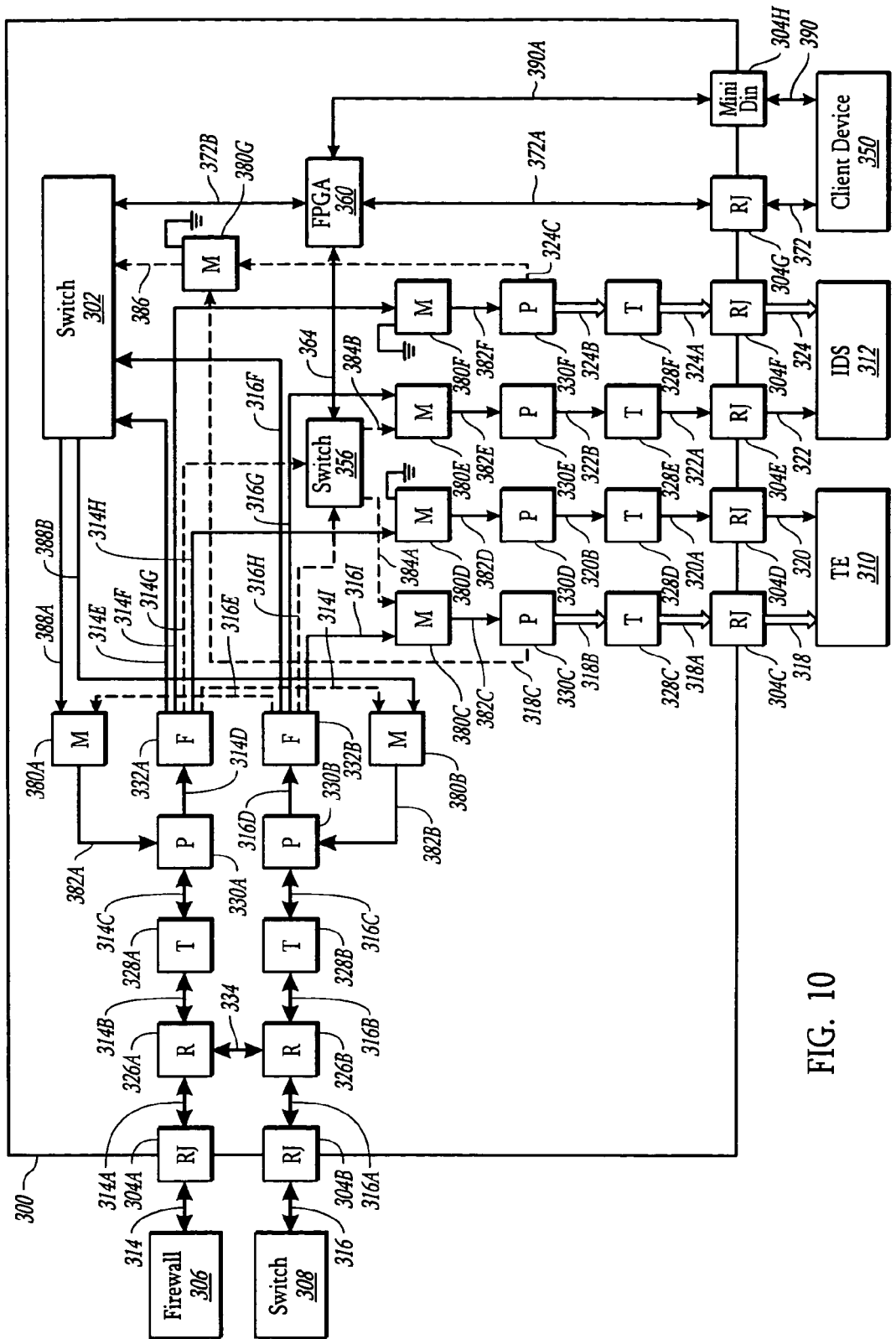
FIG. 10 illustrates a block diagram of the network tap of FIG. 3 in a switching mode.

In another embodiment, network switch 300 operates in a "switching" mode. The "switching" mode is illustrated in FIG. 10. FPGA 360 enables switch 302 while switch 356 and multiplexer 380G are disabled. The communication lines that are consequently not used are illustrated as dashed lines while those which are used are shown in solid lines.

At fan out buffers 332A, 332B, the communication lines that are used are communication lines 314E, 314F, 314H and 316F, 316G, 316I. FPGA 360 controls multiplexers 380A, 380B to only use transmissions from communication lines 388A, 388B. Thus, a complete data path is created from switch 302 to multiplexers 380A, 380B through communication lines 388A, 388B. Multiplexers 380A, 380B transmit information to physical layer devices 330A, 330B through communication lines 382, 382B. Switch 302 directs the flow of data in the main communication cable.

Ports 304C, 304D and 304E, 304F are still enabled to transmit network data but disabled from transmitting device data, with communication lines 318, 318A, 318B and 382C being modified to indicate the same in FIG. 10. Thus, testing equipment 310 and intrusion detection device 312 still operate in a passive manner, without the ability to transmit device data into network tap 300. However, the switching mode may be advantageous where switch 302 obtains statistics regarding the data flow in the main communication cable. FPGA 360 can obtain these statistics and send them to client device 350.

Figure 11:
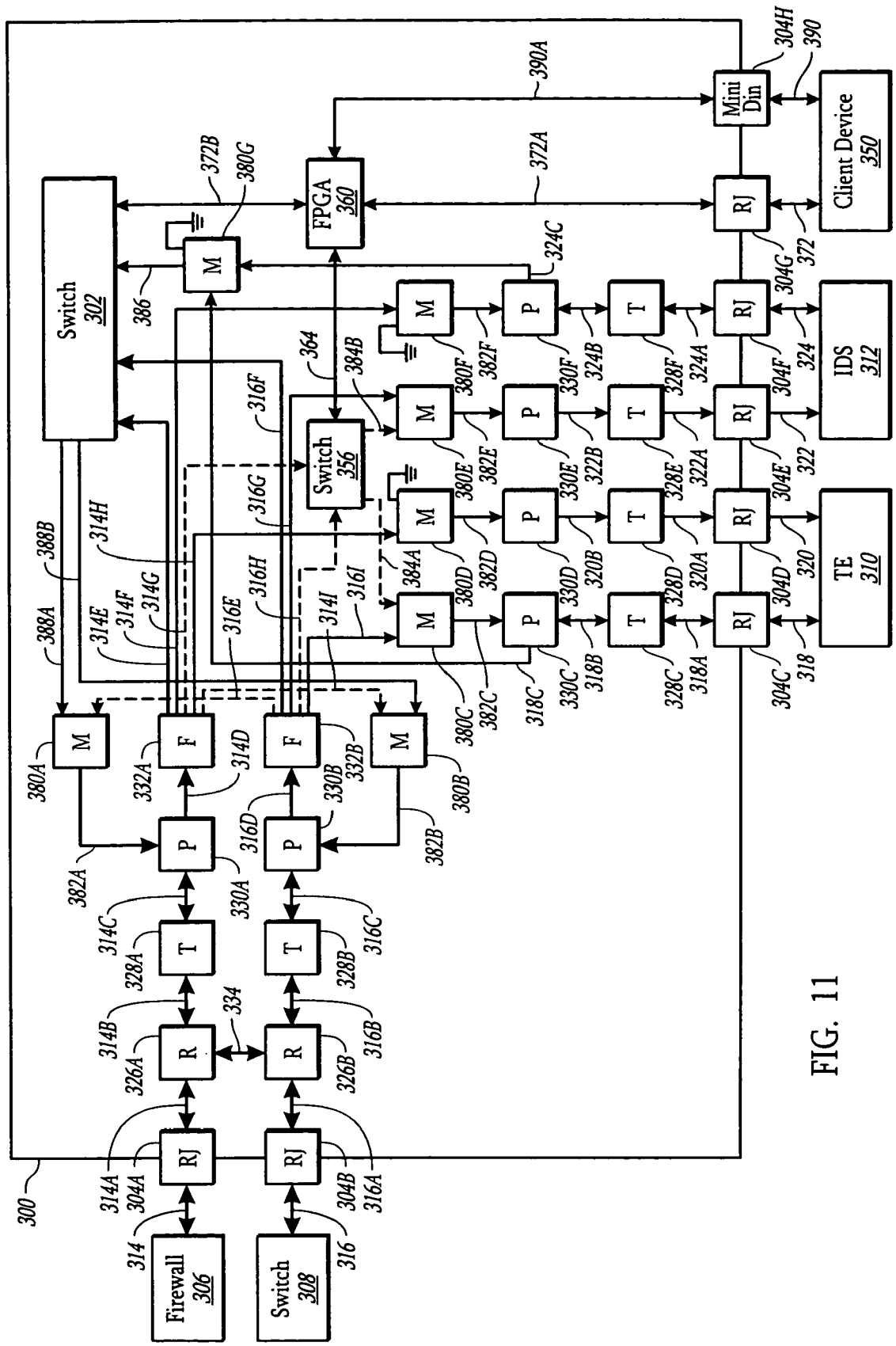
FIG. 11 illustrates a block diagram of the network tap of FIG. 3 in a switching/return path mode.

FIG. 11 depicts another embodiment of network tap 300. FIG. 11 illustrates the "switching/return path" mode. In the "switching/return path" mode, FPGA 360 enables switch 302 and multiplexer 380G while switch 356 is disabled. Thus, in addition to the data flow possible in the "switching" mode, the return path formed by communication lines 318C, 324C between physical layer devices 330C, 330F and multiplexer 380G is used, as illustrated by the solid lines in FIG. 11.

Ports 304C through 304F are enabled to transmit network data. In addition, ports 304C and 304F are now enabled to transmit device data. That is, ports 304C or 304F can operate in a bi-directional mode such that device data (e.g., kill packets) can be sent from testing equipment 310 and/or intrusion detection system 312.

It will be appreciated that testing equipment 310 and intrusion detection system 312 are interchangeable. That is, intrusion detection system 312 may be connected to either ports 304C, 304D or ports 304E, 304F. Similarly, testing equipment 310 may be connected to either ports 304C, 304D or ports 304E, 304F. Thus, it is also contemplated that testing equipment 310 is able to transmit device data into network tap 300 through either port 304C or port 304F. It will be noted that testing equipment 310 or intrusion detection system 312 may also send information to client device 350 since switch 302 will direct the device data to its intended destination.

Figure 12A:
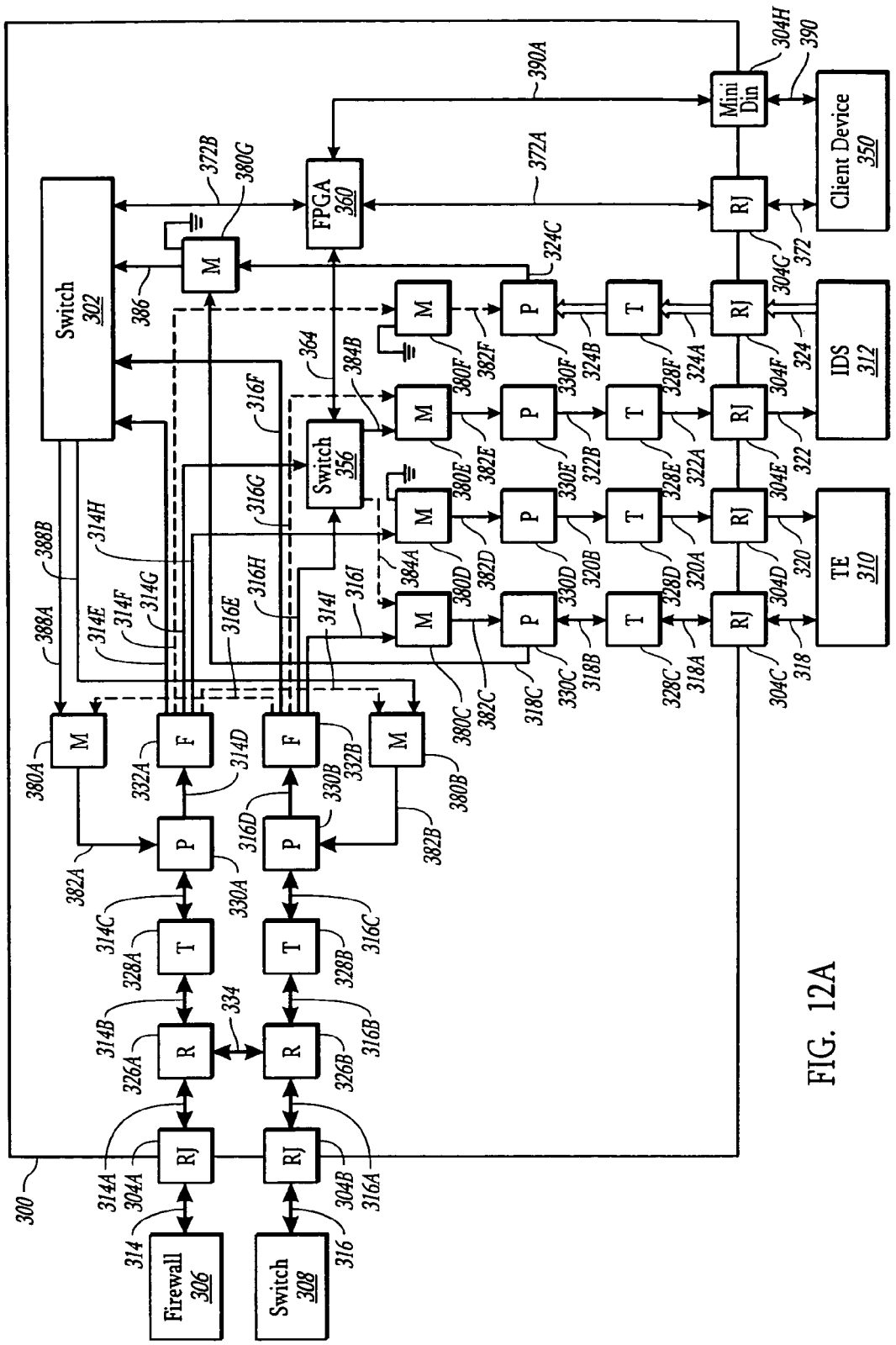
FIG. 12A illustrates a block diagram of the network tap of FIG. 3 in a switching/return path/combined tap mode, illustrating one embodiment of the port configurations possible in this mode.
Figure 12B:
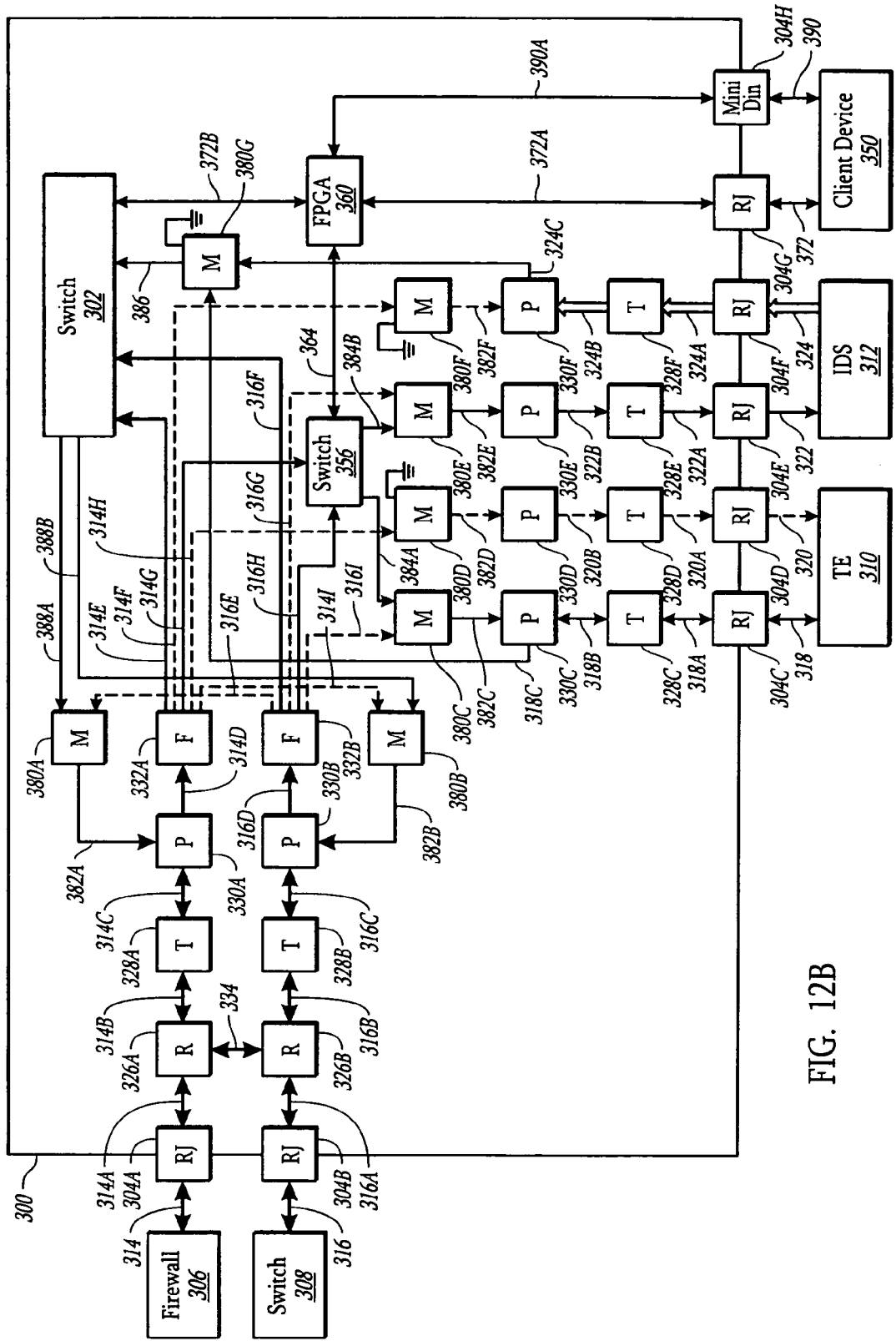
FIG. 12B illustrates a block diagram of the network tap of FIG. 3 in a switching/return path/combined tap mode, illustrating another embodiment of the port configurations possible in this mode.

FIGS. 12A and 12B illustrate network tap 300 in a "switching/return path/combined tap" mode. In the "switching/return path/combined tap" mode, FPGA 360 enables switches 302 and 356 and multiplexer 380G. That is, all of the components of network tap 300 are enabled. FPGA 360 controls multiplexers 380A, 380B to only use transmissions from communication lines 388A, 388B. The only communication lines that are not used are communication lines 314I and 316E, shown in FIG. 12 in dashed lines.

Ports 304C and 304E are configured to receive a representation of data transmissions from fan out buffers 332B through communication lines 316I, 316G, respectively. Similarly, ports 304D and 304F receive a representation of data transmission from fan out buffer 332A through communication lines 314H, 314F, respectively. In addition, switch 356 combines information from fan out buffers 332A, 332B transmitted from communication lines 314G, 316H, respectively. Switch 356 duplicates the combined information and sends the information to multiplexers 380C and 380E through communication lines 384A, 384B, respectively. Thus, ports 304C and 304E are configured to receive a representation of data transmissions from switch 356 through communication lines 384A, 384B, respectively. Thus, multiplexers 380C, 380E are connected to two incoming communication lines.

Within the "switching/return path/combined tap" mode are various port configurations that dictate whether a port is enabled or disabled to transmit network data or whether a port is enabled or disabled to transmit device data. FPGA 360 allows ports 304C through 304E to have these different configurations depending on how FPGA 360 controls multiplexers 380C through 380F. It will be appreciated that the term "port configuration" is used herein to refer to additional modes in which network tap 300 may operate. Alternatively, these port configurations may be viewed as "sub-modes" within the broadly defined modes disclosed herein.

FIG. 12A illustrates ports 304C, 304D in a first port configuration and ports 304E, 304F in a second port configuration. FIG. 12B illustrates ports 304C, 304D in a third port configuration and ports 304E, 304F again in the second port configuration. The following description will focus on how ports 304C, 304D and ports 304E, 304F can both operate in a first port configuration, even though the first port configuration is not shown with respect to ports 304E, 304F. The configuration of network tap 300 to allow ports 304E, 304F to have a second port configuration and ports 304C, 304D to have a third port configuration will be described further below.

Ports 304C, 304D and ports 304E, 304F can operate in a first port configuration. It will be appreciated that both sets of ports do not have to operate in the first port configuration at the same time, but may operate with other port configurations as illustrated in FIGS. 12A and 12B and described in more detail below. In the first port configuration, FPGA 360 controls multiplexers 380C and 380E to only use transmissions from communication lines 316I and 316G. In addition, multiplexers 380D and 380F use transmissions from communication lines 314H and 314F. Thus, ports 304C through 304F are enabled to transmit network data. In addition, ports 304C and 304F are enabled to transmit device data.

The first port configuration requires the attached device to be connected to both ports. That is, testing equipment 310 is connected to ports 304C and 304D and/or intrusion detection system 312 is connected to ports 304E and 304F. As reflected in ports 304C, 304D in FIG. 12A, one port allows network data and device data while the other port allows only network data. Thus, in the embodiment of FIG. 12A, port 304C allows bi-directional data flow and port 304D allows uni-directional data flow. In essence, the first port configuration is similar to the port configuration of FIG. 11, except switch 356 is enabled.

FIG. 12B illustrates ports 304E and 304F in a second portion configuration. FIG. 12B also depicts ports 304C and 304D in a third port configuration. It will be appreciated that the second and third port configurations may operate simultaneously. In addition, as shown below, one set of ports may operate in the second and/or third port configuration, while the other set of ports operates in the first port configuration simply by using the FPGA 360 to program which multiplexer input will pass through multiplexers 380C through 380F.

With respect to ports 304E, 304F, in the second port configuration, FPGA 360 controls multiplexer 380E to use transmissions from communication line 384B, but not communication line 316G. In addition, FPGA 360 controls multiplexer 380F to select the grounded input instead of communication line 314F so that there is effectively no output signal. It will be appreciated that all of the necessary information contained in communication lines 316G and 314F is represented in communication line 384B. Thus, port 304E is enabled to transmit network data while port 304F is disabled from transmitting network data. However, port 304F is enabled to transmit device data. Communication lines 342, 324A, 324B are redrawn in FIG. 12B to indicate that ports 304E, 304F allow uni-directional directional data flow. Such a port configuration may be advantageous to be able to connect some intrusion detection systems or other attached devices which have one cable for incoming data and a separate cable for outgoing data.

The third port configuration focuses on ports 304C and 304D. FPGA 360 controls multiplexer 380C to only use transmissions from communication line 384A. In addition, FPGA 360 controls multiplexer 380D to select the grounded input so that no data is sent out to port 304D. It will be appreciated that all of the necessary information contained in communication lines 316I and 314H is represented in communication line 384A, which is carried to port 304C. Thus, port 304C is enabled to transmit network data while port 304D is disabled from transmitting network data.

In addition, port 304C is enabled to transmit device data from testing equipment 310. Port 304C thus experiences bi-directional data flow while port 304D is essentially disabled, which is indicated by the dashed lines in FIG. 12B. This is advantageous where an attached device is configured to be connected to a network tap through a single cable. Thus, testing equipment 310 can be connected to network tap 300 through a single port, 304C.

The following table gives an example of the types of port configurations that can be operated simultaneously in the "switching/return path/combined tap" mode. The term OFF is used with multiplexers 380D and 380F where no transmissions from connecting communication lines are used. The term ON is used with multiplexers 380D and 380F to indicate that the multiplexers use whatever transmissions it is receiving from connecting communication lines. The terms MODE 1 and MODE 2 are used with the multiplexers where there is a possibility of simultaneous transmissions from the fan out buffers 332A, 332B and from switch 356. MODE 1 only uses transmissions from the communication line coming from the fan out buffer. MODE 2 only uses transmission from switch 356.

| Ports 304C/304D configuration | Ports 304E/304F configuration | MUX 380C | MUX 380D | MUX 380E | MUX 380F |
| --- | --- | --- | --- | --- | --- |
| First | First | MODE 1 | ON | MODE 1 | ON |
| First | Second | MODE 1 | ON | MODE 2 | OFF |
| Third | First | MODE 2 | OFF | MODE 1 | ON |
| Third | Second | MODE 2 | OFF | MODE 2 | OFF |

As discussed above, each configuration of ports may be interchangeably used for either testing equipment 310 or intrusion detection system 312. Thus, it will be appreciated that different combinations of testing equipment 310 and intrusion detection systems 312 may be connected to network tap 300 at any one time, depending on the user's preferences. In addition, it is not required to use both sets of ports at the same time.

Figure 13A:
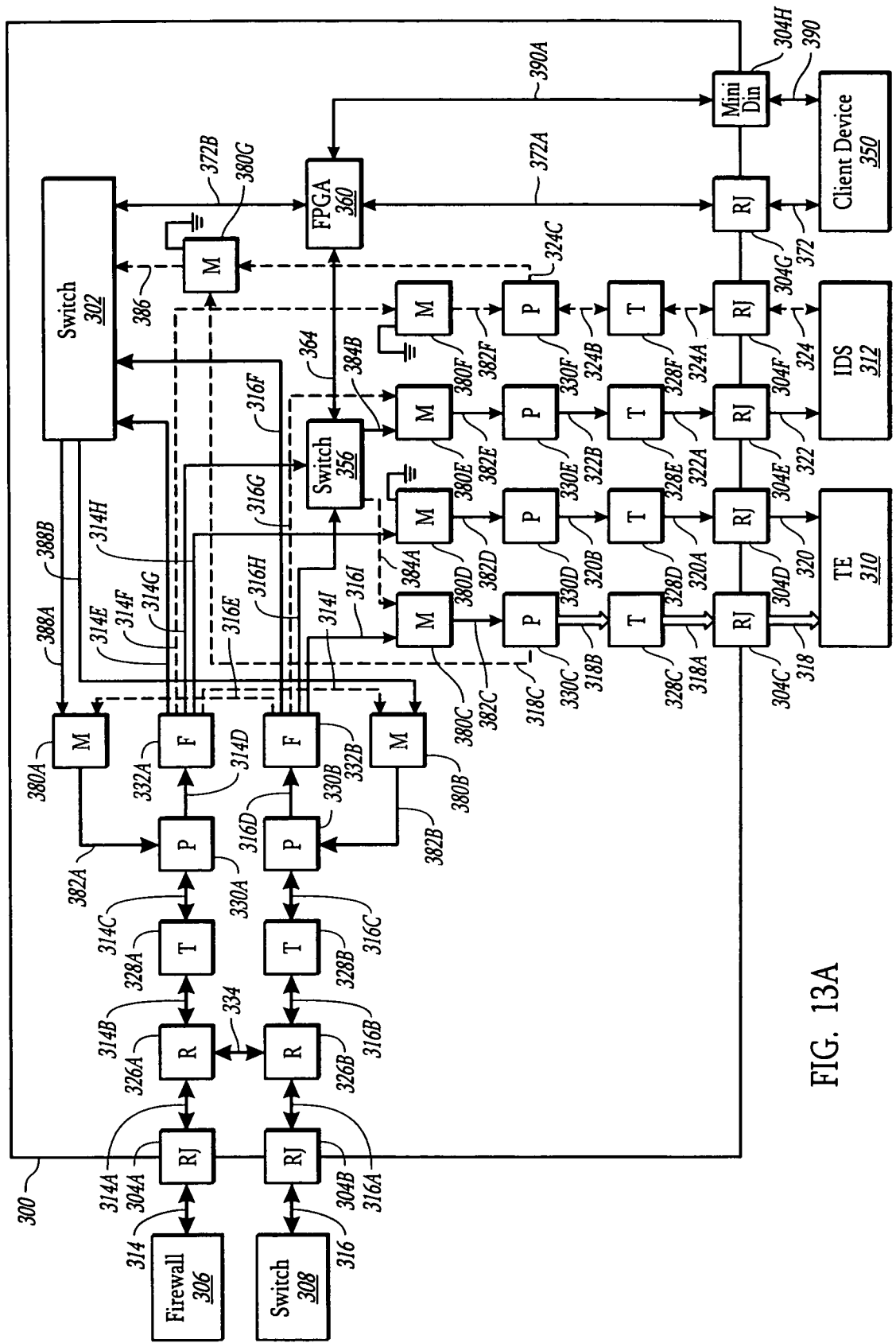
FIG. 13A illustrates a block diagram of the network tap of FIG. 3 in a switching/combined tap mode, illustrating one embodiment of the port configurations possible in this mode.
Figure 13B:
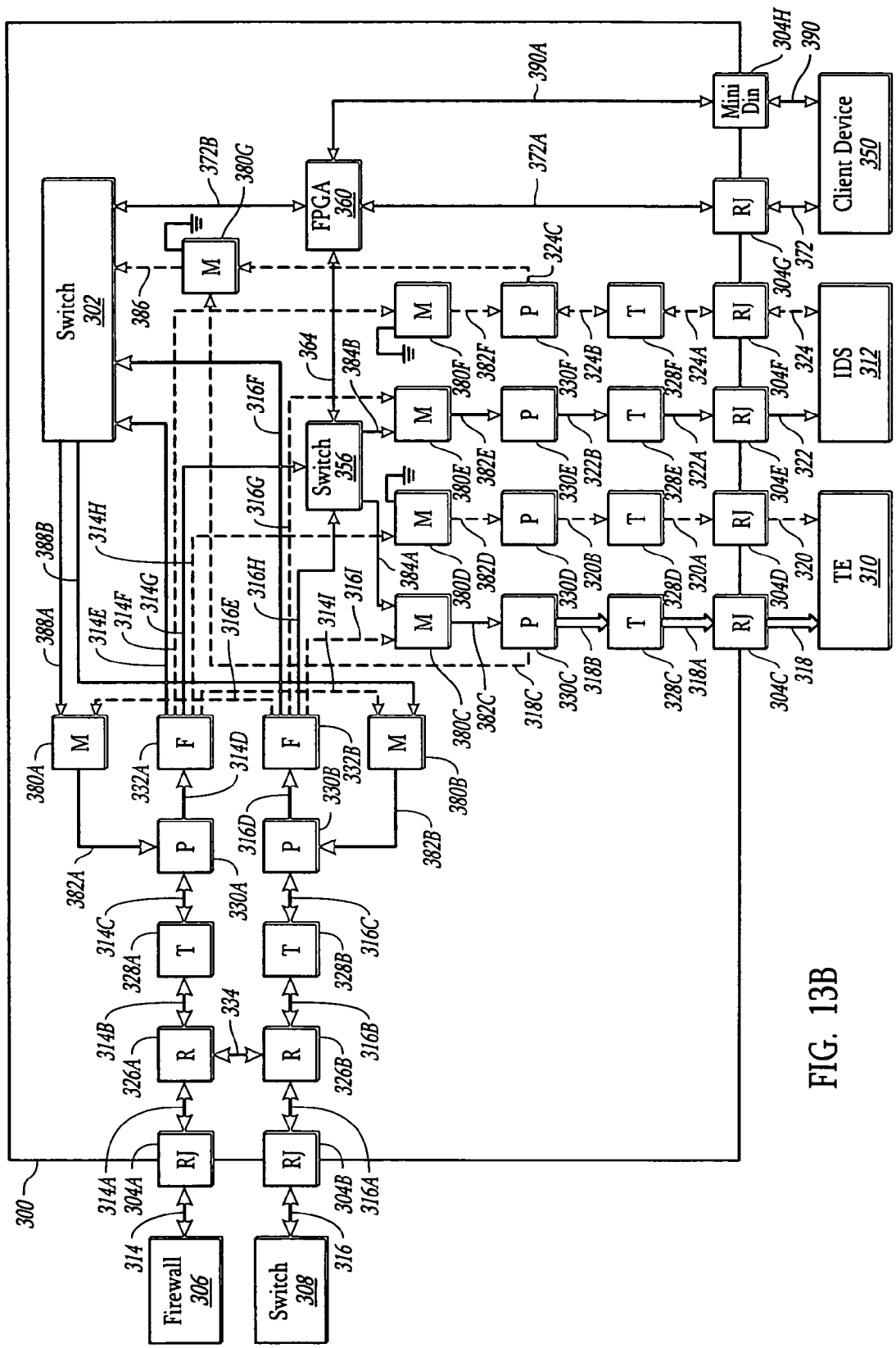
FIG. 13B illustrates a block diagram of the network tap of FIG. 3 in a switching/combined tap mode, illustrating another embodiment of the port configurations possible in this mode.

FIGS. 13A and 13B depicts a "switching/combined tap" mode. In the "switching/combined tap" mode, FPGA 360 enables switches 302 and 356 while multiplexer 380G is disabled. This causes the return paths created by communication lines 318C and 318D to be idle, as illustrated by the dashed lines in FIG. 13A. Switch 356 still combines transmissions from fan out buffers 332A, 332B, duplicates the combined information and transmits it to multiplexers 380C, 380E. Thus, multiplexers 380C, 380E have two incoming communication lines. As such, different port configurations are possible depending on how FPGA 360 controls multiplexers 380C through 380F.

FIG. 13A illustrates ports 304C, 304D in a fourth port configuration and ports 304E, 304F in a fifth port configuration. FIG. 13B illustrates both sets of ports 304C, 304D and 304E, 304F in the fifth port configuration. The following description will focus on how ports 304C, 304D and ports 304E, 304F can both operate in a fourth port configuration, even though the fourth port configuration is not shown with respect to ports 304E, 304F. The configuration of network tap 300 to allow ports 304C, 304D and ports 304E, 304F to have a fifth port configuration will be described further below.

As illustrated in FIG. 13A, a ports 304C, 304D and ports 304E, 304F can operate in a fourth port configuration, wherein multiplexers 380C through 380F use transmissions from communication lines 314F, 316G, 314G and 316I, respectively. Thus, ports 304C through 304F are enabled to transmit network data. In addition, because the return paths 318C, 324C are idle, ports 304C and 304F are disabled from transmitting device data. The fourth port configuration is similar to the "passive" mode of FIG. 9. The fourth port configuration is possible in either ports 304C and 304D or ports 304E and 304F.

In addition, as depicted in FIG. 13B, a fifth port configuration is possible in the "switching/combined tap" mode. The fifth port configuration is possible in either ports 304C and 304D or ports 304E and 304F. In the fifth port configuration, FPGA 360 controls multiplexers 380C and 380F to use transmissions from communication lines 384A, 384B. It will be appreciated that all of the necessary information contained in communication lines 316I and 314H is represented in communication lines 384A, 384B, which is carried to ports 304C, 304E. Thus, ports 304C, 304E are enabled to transmit network data.

Regarding ports 304C and 304D, FPGA 360 disables multiplexer 380D so that transmissions are not allowed through port 304D. Thus, port 304D is disabled from transmitting network data. Testing equipment 310 or intrusion detection system 312 may be connected to port 304C through a single cable to operate in a passive manner. Communication lines 318, 318A, 318B are modified to indicate the uni-directional nature of port 304C.

Regarding ports 304E and 304F, FPGA 360 disables multiplexer 380F so that transmissions are not allowed through port 304F. Port 304F is thus disabled from transmitting network data. Testing equipment 310 or intrusion detection system 312 may be connected to port 304E through a single cable to operate in a passive manner.

Thus, in the fifth port configuration, both sets of ports 304C, 304D and 304E, 304F are configured to have only one port through which an attached device is connected in a passive manner.

The following table provides the types of port configurations that can be operated simultaneously in the "switching/combined tap" mode, with the same terminology from the previous table being applied here.

| Ports 304C/304D configuration | Ports 304E/304F configuration | MUX 380C | MUX 380D | MUX 380E | MUX 380F |
| --- | --- | --- | --- | --- | --- |
| Fourth | Fourth | MODE 1 | ON | MODE 1 | ON |
| Fourth | Fifth | MODE 1 | ON | MODE 2 | OFF |
| Fifth | Fourth | MODE 2 | OFF | MODE 1 | ON |
| Fifth | Fifth | MODE 2 | OFF | MODE 2 | OFF |

Figure 14A:
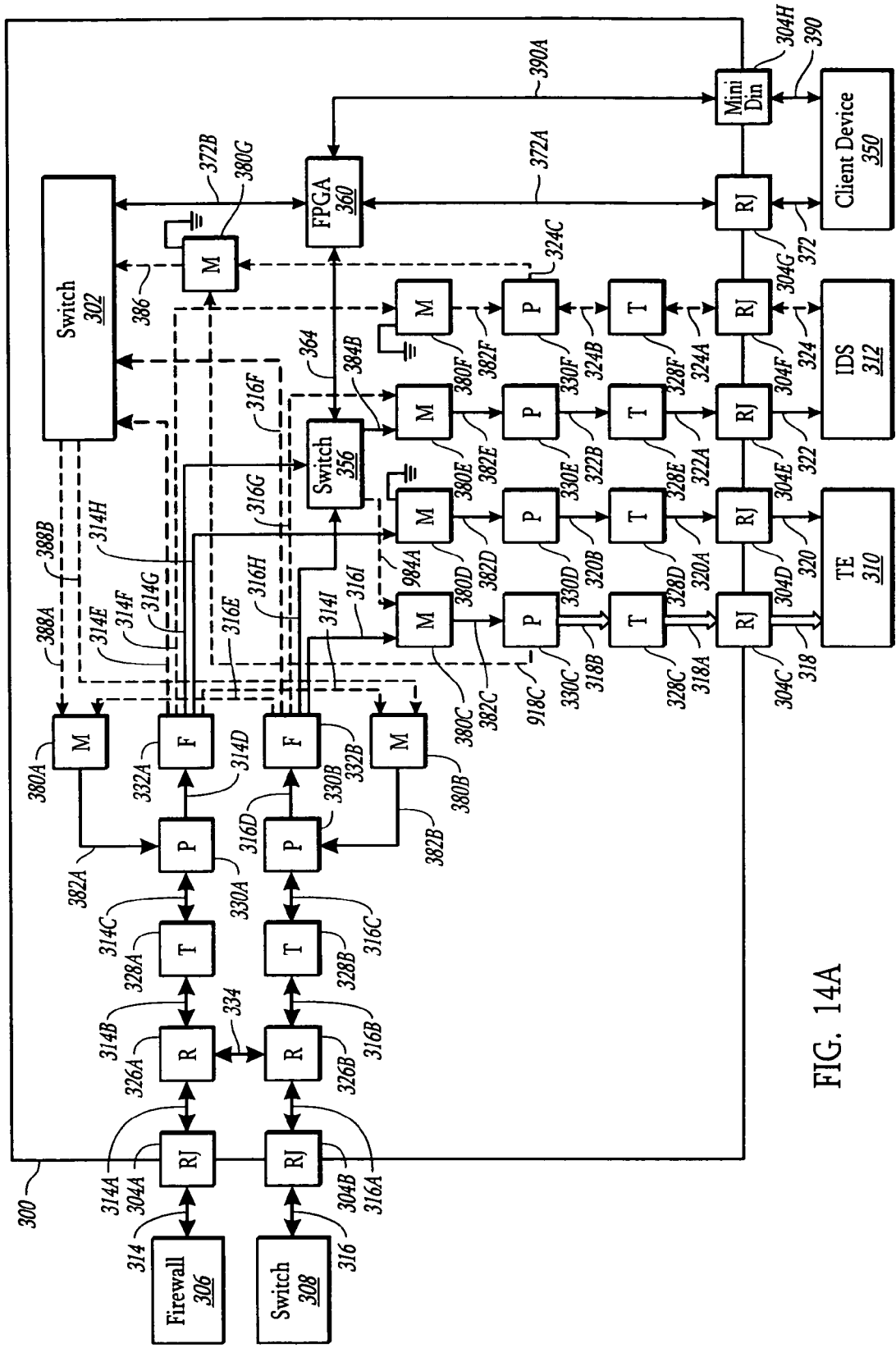
FIG. 14A illustrates a block diagram of the network tap of FIG. 3 in a combined tap mode, illustrating one embodiment of the port configurations possible in this mode.
Figure 14B:
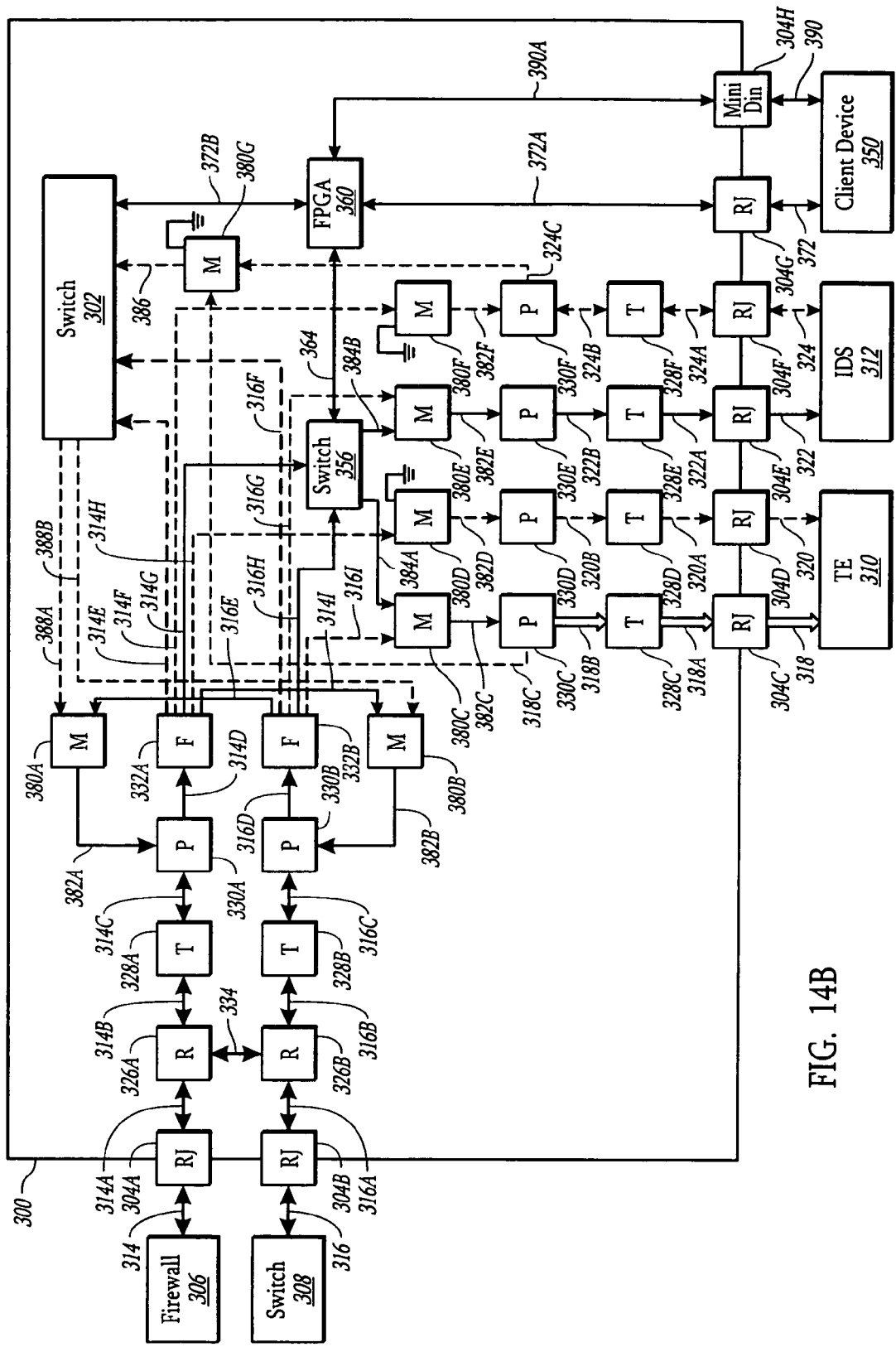
FIG. 14B illustrates a block diagram of the network tap of FIG. 3 in a combined tap mode, illustrating another embodiment of the port configurations possible in this mode.

Finally, with regard to FIGS. 14A and 14B, a "combined tap" mode is illustrated. The combined tap mode allows the exact same port configurations as the "switching/combined tap" mode. The only difference is that switch 302 is disabled so that communication lines 314I and 316E are not used. FIG. 14A illustrates ports 304C and 304D and ports 304E and 304F in the fourth port configuration. FIG. 14B illustrates ports 304C and 304D and ports 304E and 304F in the fifth port configuration. A user may choose the "switching/combined tap" mode if, for example, the user desires to collect statistics regarding the information flowing in main communication cable. On the other hand, the user may choose the "combined tap" mode if the user simply desires to connect an attached device in a passive manner through a single cable.

In view of the foregoing, network tap 300 may operate in a number of different modes controlled by the operation of FPGA 360. Within these modes are a number of port configurations which may be used to connect different types of attached devices. This may be advantageous where different manufacturers of testing equipment or intrusion detection systems may implement different connections such that network tap 300 may be used on virtually any network system.

Switching between modes may be facilitated by a software program located on client device 350. Preferably, a password or another type of appropriate management security is required to operate the software to prevent unauthorized access to the network. Alternatively, software may be loaded into FPGA 360 through client device 350. In still another embodiment, a user may be able to manually switch modes through switches or buttons on the front panel of network tap 300.

An additional benefit of using an FPGA is that the operation of the network tap can be digitally controlled in a robust and programmable way. This permits the network tap to perform any of a variety of operations that have not been possible in conventional network taps that do not include an FPGA or a similar digital controller. Some of these functions include the network analysis and statistics gathering operations described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A network tap that permits an attached device to communicate with a node of a network, the node of the network communicating with a network cable transmitting network data thereon, the network cable having a first segment and a second segment, the network tap comprising:
a first and second tap port, at least one of which is configured to receive a copy of network data obtained from the network cable, wherein the attached device can be selectively connected to at least one of the first and second tap ports and at least one of the first and second tap ports is configured to receive device data from the attached device, the first and second tap ports being capable of operating in a plurality of modes, each being defined by enabling or disabling the ability of the first and second tap ports to receive network data and device data;
means for inserting device data from the attached device into the network cable without disrupting the flow of network data in the network cable, wherein the means for inserting device data coordinates transmission of the device data in the network cable with the network data flowing therein to avoid data collisions; and
means for selecting one of the plurality of modes in which the first and second tap ports operate.

2. The network tap as recited in claim 1, wherein in one mode, the first and second tap ports are both enabled to receive the network data.

3. The network tap as recited in claim 2, wherein in one mode, at least one of the first and second tap ports are enabled to receive device data.

4. The network tap as recited in claim 2, wherein in one mode, the first and second tap ports are both disabled from receiving device data.

5. The network tap as recited in claim 1, wherein in one mode, one of the first and second tap ports is enabled to receive network data and the other of the first and second tap ports is disabled from receiving network data.

6. The network tap as recited in claim 5, wherein in one mode, the one of the first and second tap ports that is enabled to receive network data is also enabled to receive device data.

7. The network tap as recited in claim 5, wherein in one mode, the one of the first and second tap ports that is enabled to receive network data is disabled from receiving device data.

8. The network tap as recited in claim 5, wherein in one mode, the one of the first and second tap ports that is disabled from receiving network data is enabled to receive device data.

9. The network tap as recited in claim 5, wherein in one mode, the one of the first and second tap ports that is disabled from receiving network data is also disabled from receiving device data.

10. The network tap as recited in claim 1, wherein means for inserting received device data into the network cable without disrupting the flow of data therein comprises an Ethernet switch.

11. The network tap as recited in claim 1, wherein means for inserting received device data into the network cable without disrupting the flow of data therein comprises an integrated circuit.

12. The network tap as recited in claim 11, wherein the integrated circuit comprises a field programmable gate array.

13. The network tap as recited in claim 1, wherein means for selecting one of the plurality of modes in which the first and second tap ports may operate comprises:
a management port configured to selectively connect to a remote computer; and
an integrated circuit configured to receive management data from the management port to at least indirectly enable or disable the ability of the first and second tap port to receive at least one of network data and device data.

14. The network tap as recited in claim 1, wherein means for selecting one of the plurality of modes in which the first and second tap ports may operate comprises one or more manual switches located on the network tap.

15. A network tap that permits an attached device to communicate with a node of a network, the node of the network communicating with a network cable transmitting network data thereon, the network cable having a first segment and a second segment, the network tap comprising:
a first tap port configured to receive a copy of network data obtained from the network cable;
a second tap port configured to receive a copy of network data obtained from the network cable, wherein the attached device can be selectively connected to at least one of the first tap port and second tap port, wherein at least one of the first tap port and second tap port is configured to receive device data from the attached device that is transmitted on the network cable, and wherein the first tap port and second tap port are configured to operate in a plurality of modes, each mode being defined by enabling or disabling the ability of the first tap port and second tap port to receive network data and device data
a routing node that is in communication with the first tap port and second tap port, the routing node being configured to pass network data from the network cable to at least one of the first tap port and the second tap port and to pass device data from at least one of the first tap port and second tap port to the network cable without disrupting a flow of the network data in the network cable, wherein the routing node coordinates transmission of the device data with the network data to avoid data collisions between the network data and the device data; and
an integrated circuit configured to select the mode in which the first tap port and second tap port operate.

16. The network tap as recited in claim 15, wherein the integrated circuit enables both the first tap port and the second tap port to receive network data.

17. The network tap as recited in claim 16, wherein the integrated circuit enables at least one of the first tap port and second tap port to receive device data.

18. The network tap as recited in claim 17, wherein:
the attached device is an intrusion detection system; and
the device data comprises a kill packet from the intrusion detection system, the routing node being configured for transmitting the kill packet via the network cable to a firewall.

19. The network tap as recited in claim 16, further comprising:
a first multiplexer in communication with the first tap port; and
a second multiplexer in communication with the second tap port, wherein the integrated circuit controls the first multiplexer and second multiplexer to select the mode in which the first tap port and second tap port operate.

20. The network tap as recited in claim 16, wherein the integrated circuit disables both the first tap port and second tap port from receiving device data.

21. The network tap as recited in claim 15, wherein the integrated circuit enables one of the first tap port and second tap port to receive network data, forming a combined network data port, and disables the other of the first tap port and second tap port from receiving network data, forming a disabled network data port.

22. The network tap as recited in claim 21, wherein the integrated circuit enables the combined network data port to also receive device data.

23. The network tap as recited in claim 21, wherein the integrated circuit disables the combined network data port from receiving device data.

24. The network tap as recited in claim 21, wherein the integrated circuit enables the disabled network data port to receive device data.

25. The network tap as recited in claim 21, wherein the integrated circuit disables the disabled network data port from receiving device data.

26. A network tap that permits an attached device to communicate with a node of a network, the node of the network communicating with
   a network cable transmitting network data thereon, the network tap comprising:
   a first network port configured to transmit or receive network data;
   a second network port configured to transmit or receive network data;
   a first tap port configured to receive a copy of at least some of the network data;
   a second tap port configured to receive a copy of at least some of the network data, wherein an attached device can be selectively connected to at least one of the first tap port and second tap port, wherein at least one of the first tap port and second tap port is configured to receive device data from the attached device, and wherein the first tap port and second tap port are configured to operate in a plurality of modes, each mode being defined by enabling or disabling the ability of the first tap port and second tap port to receive network data and device data; and
   a first switch that is in communication with the first network port and the second network port and with the first tap port and second tap port, the switch being configured to pass network data between the first network port and the second network port and transmit device data from one of the first tap port and second tap port to one of the first network port and second network port on the network cable without disrupting a flow of the network data in the network cable, wherein the first switch coordinates transmission of the device data with the network data to avoid data collisions on the network cable.

27. The network tap of claim 26, further comprising a second switch that is in communication with the first network port and the second network port and with the first tap port and the second tap port, the switch being configured to combined network data from the first network port and second network port and transmit the combined network data to one of the first tap port and second tap port.

28. The network tap of claim 27, further comprising:
   a third tap port configured to receive a copy of at least some of the network data; and
   a fourth tap port configured to receive a copy of at least some of the network data, wherein the second switch is configured to duplicate the combined network data and transmit the combined network data to one of the third tap port and fourth tap port.

29. The network tap of claim 26, further comprising an integrated circuit configured to select the mode in which the first tap port and the second tap port operate.

30. The network tap of claim 29, wherein the integrated circuit comprises a Field Programmable Gate Array.

31. The network tap of claim 26, further comprising a management port configured to transmit management data to the integrated circuit, the management port being configured to be selectively connected to a remote computer.

32. The network tap of claim 26, further comprising a first communication line from the first network port to the first switch and a second communication line from the second network port to the first switch, each of the first communication line and the second communication line including:
   a relay for circumventing the first switch in the event of loss of power at the network tap;
   a transformer; and
   a fan out buffer that propagates the network data to the switch and propagates a copy of the network data to the first tap port and second tap port.

33. The network tap of claim 32, further comprising a third communication line for transmitting device data from one of the first tap port and second tap port to the first switch, the third communication line including:
   a transformer;
   a physical layer device; and
   a multiplexer.

* * * * *